US012647887B2

(12) United States Patent
Kim

(10) Patent No.: US 12,647,887 B2
(45) Date of Patent: Jun. 2, 2026

(54) METHOD AND APPARATUS FOR POWER SAVING IN WIRELESS MOBILE COMMUNICATION SYSTEM

(71) Applicants: BLACKPIN Inc., Seoul (KR);
Soenghun Kim, Hanam-si (KR)

(72) Inventor: Soenghun Kim, Hanam-si (KR)

(73) Assignees: BLACKPIN INC., Seoul (KR);
Seonghun Kim, Gyeonggi-do (KR)

( * ) Notice: Subject to any disclaimer, the term of this patent is extended or adjusted under 35 U.S.C. 154(b) by 305 days.

(21) Appl. No.: 18/433,473

(22) Filed: Feb. 6, 2024

(65) Prior Publication Data

US 2024/0276372 A1 Aug. 15, 2024

(30) Foreign Application Priority Data

Feb. 10, 2023 (KR) ........................ 10-2023-0017748

(51) Int. Cl.
H04W 52/02 (2009.01)
H04W 76/28 (2018.01)

(52) U.S. Cl.
CPC ... H04W 52/0216 (2013.01); H04W 52/0235 (2013.01); H04W 76/28 (2018.02)

(58) Field of Classification Search
CPC . H04W 52/00; H04W 52/02; H04W 52/0203; H04W 52/0216; H04W 52/0225; H04W 52/0229; H04W 52/0235; H04W 52/04; H04W 52/08; H04W 52/10; H04W 52/125; H04W 52/143; H04W 52/146; H04W 36/165; H04L 1/0053
See application file for complete search history.

(56) References Cited

U.S. PATENT DOCUMENTS

| | | | | |
|---|---|---|---|---|
| 2017/0367045 | A1* | 12/2017 | Rahman | H04W 76/15 |
| 2022/0183101 | A1* | 6/2022 | Jang | H04L 5/0057 |
| 2022/0256622 | A1* | 8/2022 | Li | H04W 76/28 |
| 2022/0369418 | A1* | 11/2022 | Ma | H04W 76/28 |
| 2023/0036099 | A1* | 2/2023 | He | H04W 52/0274 |
| 2023/0262598 | A1* | 8/2023 | Bergström | H04W 52/0241 |
| | | | | 370/311 |

(Continued)

FOREIGN PATENT DOCUMENTS

WO WO-2023132726 A1 * 7/2023 ............. H04L 5/001

OTHER PUBLICATIONS

3GPP TS 38.211 V17.4.0 (Dec. 2022) Technical Specification; 3rd Generation Partnership Project; Technical Specification Group Radio Access Network; NR; Physical channels and modulation(Release 17).

(Continued)

*Primary Examiner* — Warner Wong
(74) *Attorney, Agent, or Firm* — Nicholas Park

(57) ABSTRACT

A Method and Apparatus for discontinuous reception and discontinuous transmission are provided. The method includes transmitting a UECapabilityInformation to the GNB, receiving a RRCReconfiguration form the GNB, performing a first DRX operation for a first cell and a third DRX operation for a second cell based on the RRCReconfiguration and current-drx2-ConfigId, receiving a first MAC CE from the GNB and performing DRX operation based on the first MAC CE. The performing DRX operation comprises receiving or not receiving downlink reference signal.

20 Claims, 11 Drawing Sheets

(56) References Cited

U.S. PATENT DOCUMENTS

| 2023/0354192 | A1* | 11/2023 | Abedini | H04W 52/0216 |
|---|---|---|---|---|
| 2024/0276371 | A1* | 8/2024 | Kim | H04W 76/28 |
| 2024/0276590 | A1* | 8/2024 | Kim | H04W 76/28 |
| 2025/0393052 | A1* | 12/2025 | He | H04L 5/001 |

OTHER PUBLICATIONS

3GPP TS 38.212 V17.4.0 (Dec. 2022); Technical Specification;3rd Generation Partnership Project; Technical Specification Group Radio Access Network; NR; Multiplexing and channel coding (Release 17).

3GPP TS 38.213 V17.4.0 (Dec. 2022); Technical Specification; 3rd Generation Partnership Project; Technical Specification Group Radio Access Network; NR; Physical layer procedures for control (Release 17).

3GPP TS 38.214 V17.4.0 (Dec. 2022); Technical Specification; 3rd Generation Partnership Project; Technical Specification Group Radio Access Network; NR; Physical layer procedures for data (Release 17).

3GPP TS 38.331 V17.3.0 (Dec. 2022); Technical Specification; 3rd Generation Partnership Project; Technical Specification Group Radio Access Network; NR; Radio Resource Control (RRC) protocol specification (Release 17).

3GPP TS 38.321 V17.3.0 (Dec. 2022); Technical Specification; 3rd Generation Partnership Project; Technical Specification Group Radio Access Network; NR; Medium Access Control (MAC) protocol specification (Release 17).

CATT, "Remaining issues on Cell DTX/DRX," 3GPP TSG-RAN WG2 Meeting #120, Toulouse, France, R2-2211443, Nov. 14-18, 2022.

Sony, "Discussion on idle and inactive state UE grouping for NES gNB DTX," 3GPP TSG RAN WG2 Meeting #120, Toulouse, France, R2-2211920, Nov. 14-18, 2022.

OPPO, "Discussion on DTX/DRX mechanism," 3GPP TSG-RAN WG2 #120, Toulouse, France, R2-2211953, Nov. 2022.

Intel Corporation, "Considerations of Cell DTX and DRX," 3GPP TSG-RAN WG2 Meeting #120, Toulouse, France, R2-2212113, Nov. 14-18, 2022.

Interdigital, "Cell DTX/DRX," 3GPP RAN WG2 Meeting #120, Toulouse, France, R2-2212324, Nov. 14-19, 2022.

LG Electronics Inc., "Discussion on DTX/DRX mechanism," 3GPP TSG-RAN2 #120, Toulouse, France, R2-2212851, Nov. 14-18, 2022.

Huawei et al., "Discussion on cell DTX/DRX," 3GPP TSG-RAN WG2 Meeting #120, Toulouse, France, R2-2212869, Nov. 14-18, 2022.

InterDigital, "Report of [301][NES] Summary of DTX/DRX—8.3.2," 3GPP RAN WG2 Meeting #120, Toulouse, France, R2-2213071, Nov. 14-19, 2022.

InterDigital, "Report of [301][NES] Summary of DTX/DRX—8.3.2," 3GPP RAN WG2 Meeting #120, Toulouse, France, R2-2213075, Nov. 14-19, 2022.

3GPP TSG RAN WG2, R2-2213076, Nov. 2022.

3GPP TSG RAN WG2, R2-2213077, Nov. 2022.

* cited by examiner

User Plane Protocol Stack

Control Plane Protocol Stack

3a-11 transmitting a UECapabilityInformation to the GNB

3a-21 receiving a RRCReconfiguration form the GNB

3a-31 performing DRX operation based on the RRCReconfiguration and current-drx2-ConfigId

3a-41 receiving a first MAC CE from the GNB

3a-51 performing DRX operation based on the first MAC CE 3b-11
transmitting a UECapabilityInformation to the GNB 3b-21
receiving a RRCReconfiguration form the GNB 3b-31
performing DTX operation based on the RRCReconfiguration 3b-41
receiving a first MAC CE from the GNB 3b-51
performing DTX operation based on the first MAC CE

METHOD AND APPARATUS FOR POWER SAVING IN WIRELESS MOBILE COMMUNICATION SYSTEM

CROSS-REFERENCE TO RELATED APPLICATION

This application claims priority to and the benefit of Korean Patent Application No. 10-2023-0017748, filed on Feb. 10, 2023, the disclosure of which is incorporated herein by reference in its entirety.

BACKGROUND

Technical Field

The present disclosure relates to discontinuous reception and discontinuous transmission in wireless mobile communication system.

Related Art

To meet the increasing demand for wireless data traffic since the commercialization of 4th generation (4G) communication systems, the 5th generation (5G) system is being developed. For the sake of high data rate, 5G system introduced millimeter wave (mmW) frequency bands (e. g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability.

Power consumption is getting more attentions in mobile communication industry. To make 5G system more sustainable in terms of power consumption, more sophisticated discontinuous reception technique in both ends of terminal and radio access network is required.

SUMMARY

Aspects of the present disclosure are to address discontinuous reception and discontinuous transmission. The method includes transmitting a UECapabilityInformation to the GNB, receiving a RRCReconfiguration form the GNB, performing a first DRX operation for a first cell and a third DRX operation for a second cell based on the RRCReconfiguration and current-drx2-ConfigId, receiving a first MAC CE from the GNB and performing DRX operation based on the first MAC CE. The performing DRX operation comprises receiving or not receiving downlink reference signal.

DETAILED DESCRIPTION

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the latest 3GPP standards are used for convenience of explanation. However, the present disclosure is not limited by use of these terms and definitions and other arbitrary terms and definitions may be employed instead.

Figure 1A:
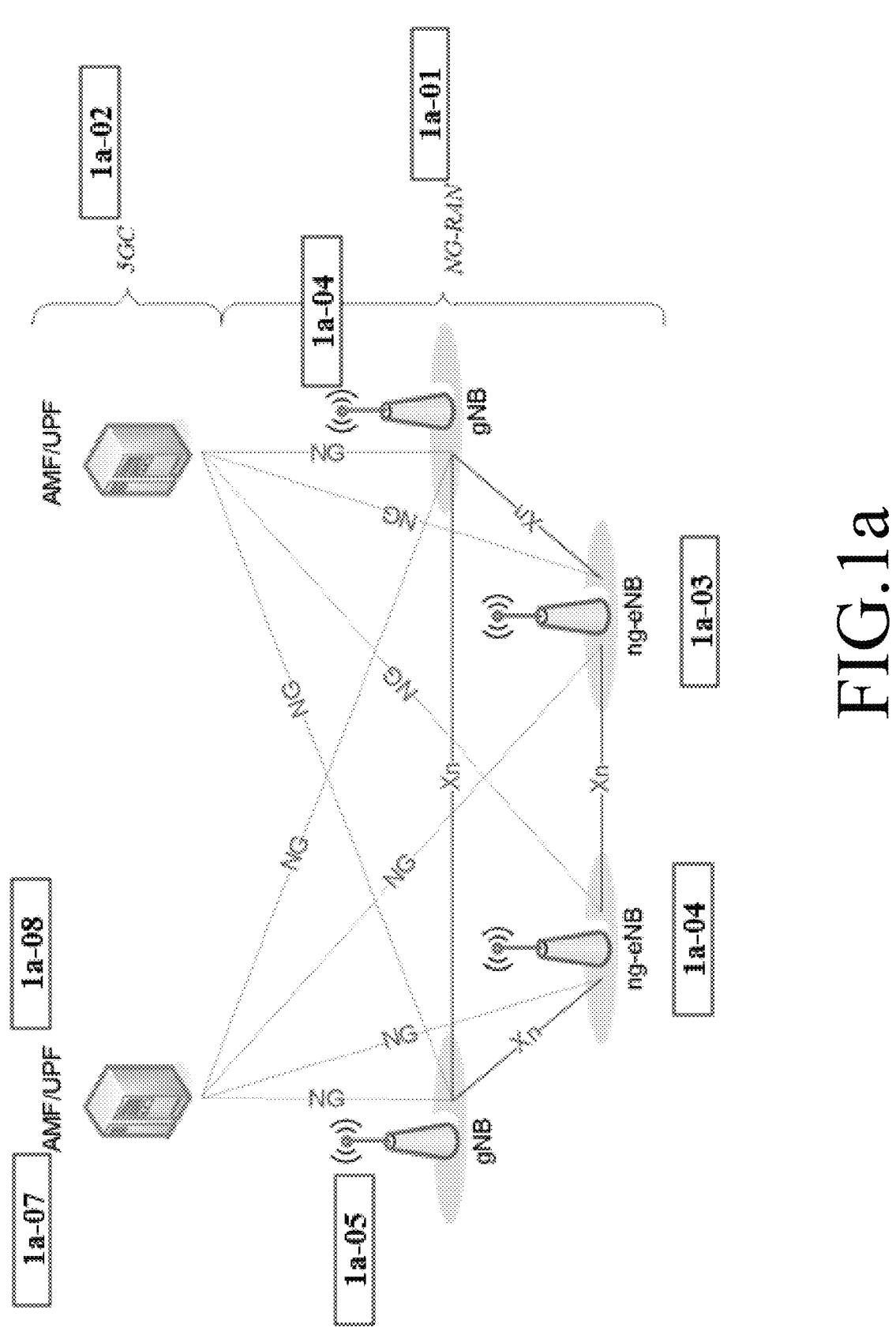
FIG. 1a is a diagram illustrating the architecture of an 5G system and a NG-RAN.

FIG. 1a is a diagram illustrating the architecture of an 5G system and a NG-RAN to which the disclosure may be applied.

5G system consists of NG-RAN (1a-01) and 5GC (1a-02). An NG-RAN node is either gNB (providing NR user plane and control plane protocol terminations towards the UE) or an ng-eNB (providing E-UTRA user plane and control plane protocol terminations towards the UE).

The gNBs (1a-05 or 1a-06) and ng-eNBs (1a-03 or 1a-04) are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF (1a-07) and UPF (1a-08) may be realized as a physical node or as separate physical nodes.

A gNB (1a-05 or 1a-06) or an ng-eNBs (1a-03 or 1a-04) hosts the functions listed below.

Functions for Radio Resource Management such as Radio Bearer Control, Radio Admission Control, Connection Mobility Control, Dynamic allocation of resources to UEs in uplink, downlink and sidelink(scheduling); and IP and Ethernet header compression, uplink data decom-
pression and encryption of user data stream; and Selection of an AMF at UE attachment when no routing
to an MME can be determined from the information
provided by the UE; and Routing of User Plane data towards UPF; and Scheduling and transmission of paging messages; and Scheduling and transmission of broadcast information
(originated from the AMF or O&M); and Measurement and measurement reporting configuration
for mobility and scheduling; and Session Management; and QoS Flow management and mapping to data radio bear-
ers; and Support of UEs in RRC_INACTIVE state; and Radio access network sharing; and Tight interworking between NR and E-UTRA; and Support of Network Slicing.

The AMF (1a-07) hosts the functions such as NAS
signaling, NAS signaling security, AS security control, SMF
selection, Authentication, Mobility management and posi-
tioning management.

The UPF (1a-08) hosts the functions such as packet
routing and forwarding, transport level packet marking in
the uplink, QoS handling and the downlink, mobility
anchoring for mobility etc.

Figure 1B:
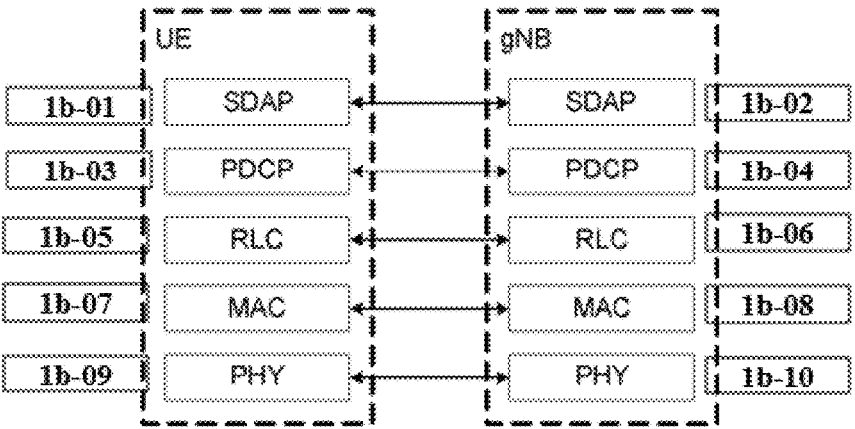
FIG. 1b is a diagram illustrating a wireless protocol architecture in an 5G system.
Figure 1B:
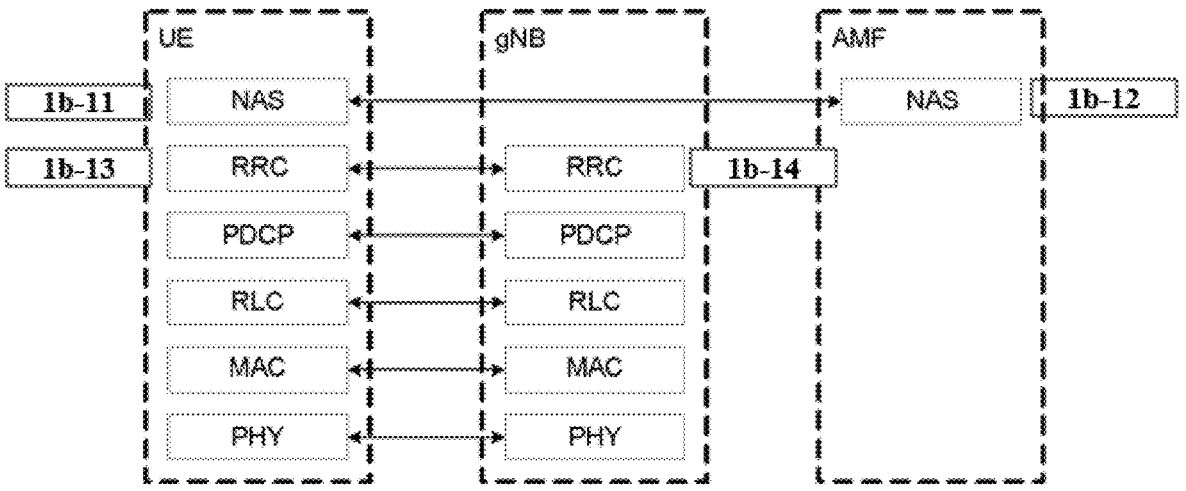

FIG. 1b is a diagram illustrating a wireless protocol
architecture in an 5G system to which the disclosure may be
applied.

User plane protocol stack consists of SDAP (1b-01 or
1b-02), PDCP (1b-03 or 1b-04), RLC (1b-05 or 1b-06),
MAC (1b-07 or 1b-08) and PHY (1b-09 or 1b-10). Control
plane protocol stack consists of NAS (1b-11 or 1b-11b-),
RRC (1b-13 or 1b-14), PDCP, RLC, MAC and PHY.

Each protocol sublayer performs functions related to the
operations listed below.

NAS: authentication, mobility management, security con-
trol etc

RRC: System Information, Paging, Establishment, main-
tenance and release of an RRC connection, Security func-
tions, Establishment, configuration, maintenance and release
of Signalling Radio Bearers (SRBs) and Data Radio Bearers (DRBs), Mobility, QoS management, Detection of and
recovery from radio link failure, NAS message transfer etc.

SDAP: Mapping between a QoS flow and a data radio
bearer, Marking QoS flow ID (QFI) in both DL and UL
packets.

PDCP: Transfer of data, Header compression and decom-
pression, Ciphering and deciphering, Integrity protection
and integrity verification, Duplication, Reordering and in-
order delivery, Out-of-order delivery etc.

RLC: Transfer of upper layer PDUs, Error Correction
through ARQ, Segmentation and re-segmentation of RLC
SDUs, Reassembly of SDU, RLC re-establishment etc.

MAC: Mapping between logical channels and transport
channels, Multiplexing/demultiplexing of MAC SDUs
belonging to one or different logical channels into/from
transport blocks (TB) delivered to/from the physical layer on
transport channels, Scheduling information reporting, Pri-
ority handling between UEs, Priority handling between
logical channels of one UE etc.

PHY: Channel coding, Physical-layer hybrid-ARQ pro-
cessing, Rate matching, Scrambling, Modulation, Layer
mapping, Downlink Control Information, Uplink Control
Information etc.

In case of Supplementary Uplink, the UE is configured
with 2 UL carriers (NUL and SUL) for one DL carrier of the
same cell, and uplink transmissions on those two UL carriers
are controlled by the network to avoid overlapping PUSCH/
PUCCH transmissions in time. Overlapping transmissions
on PUSCH are avoided through scheduling while overlap-
ping transmissions on PUCCH are avoided through configu-
ration (PUCCH can only be configured for only one of the
2 ULs of the cell). In addition, initial access is supported in
each of the uplink.

The UE may be indicated, when configured accordingly,
whether it is required to monitor or not the PDCCH during
the next occurrence of the on-duration (of DRX1) by a DCP
(DCI with CRC scrambled by PS-RNTI) monitored on the
active BWP. If the UE does not detect a DCP on the active
BWP, it does not monitor the PDCCH (for DRX1) during the
next occurrence of the on-duration, unless it is explicitly
configured to do so in that case.

Signals related with DRX/DTX operations are listed and
explained in table 1. Following signals are transmitted or
received by a base station in a cell.

TABLE 1

| index | Name | related to | Note |
|---|---|---|---|
| 1 | downlink_synch | initial access & RRM & RLM | Such as SSB |
| 2 | downlink_csi_reference | channel estimation & RRM & RLM | Such as CSI-RS and TRS |
| 3 | downlink_demodulation_reference | demodulation | Such as PBCH DMRS, PDCCH DMRS and PDSCH DMRS |
| 4 | downlink_phase_tracking_reference | phase noise tracking | Such as PTRS |
| 5 | downlink_positioning_reference | positioning | Such as PRS |
| 6 | downlink_system_information_common_pdcch | system information | DCI 1_0 addressed by SI-RNTI |
| 7 | downlink_paging_common_pdcch | paging, Short Message | DCI 1_0 addressed by P-RNTI; PDCCH carrying Short Message |
| 8 | downlink_random_access_common_pdcch | RAR, Msg4, MsgB | DCI 1_0 addressed by RA-RNTI addressed by DCI 1_0 addressed by T C-RNTI |
| 9 | downlink_TPC_SRS_group_pdcch | TPC commands for SRS transmissions for group of UEs | DCI 2_3 addressed by TPC-SRS-RNTI |

TABLE 1-continued

| index | Name | related to | Note |
|---|---|---|---|
| 10 | downlink_Cancel_UE_pdcch | notifying the PRB(s) and OFDM symbol(s) where UE cancels the corresponding UL transmission | DCI 2_4 addressed by CI-RNTI |
| 11 | downlink_availability_UE_pdcch | notifying the availability of soft resources | DCI 2_5 addressed by AI-RNTI |
| 12 | downlink_power_saving_group_pdcch | notifying the power saving information outside DRX Active Time for one or more UEs | DCI 2_6 addressed by PS-RNTI |
| 13 | downlink_pei_group_pdcch | notifying the paging early indication and TRS availability indication for one or more UEs. | DCI 2_7 addressed by PEI-RNTI |
| 14 | downlink_NR_Sidelink_UE_pdcch_dynamic | scheduling of NR PSCCH and NR PSSCH | DCI 3_0 addressed by SL-RNTI or SL-CS-RNTI |
| 15 | downlink_NR_Sidelink_UE_pdcch_configured | scheduling of NR PSCCH and NR PSSCH | DCI 3_0 addressed by SL-CS-RNTI |
| 16 | downlink_LTE_Sidelink_UE_pdcch_configured | scheduling of LTE PSCCH and LTE PSSCH | DCI 3_1 addressed by SL Semi-Persistent Scheduling V-RNTI |
| 17 | downlink_broadcast_group_pdcch_dynamic | scheduling of PDSCH for broadcast | DCI 4_0 addressed by MCCH-RNTI or G-RNTI |
| 18 | downlink_multicast_group_pdcch_dynamic | scheduling of PDSCH for multicast | DCI 4_1 addressed by G-RNTI |
| 19 | downlink_multicast_group_pdcch_configured | scheduling of PDSCH for multicast | DCI 4_1 addressed by G-CS-RNTI |
| 20 | downlink_system_information_common_pdsch | system information | PDSCH carrying system information |
| 21 | downlink_paging_common_pdsch | paging | PDSCH carrying paging |
| 22 | downlink_random_access_common_pdsch | RAR, Msg4, MsgB | PDSCH carrying RAR or Msg4 or MsgB |
| 23 | downlink_PUSCH_UE_pdcch_dynamic | scheduling of PUSCH via dynamic grant | DCI 0_0 and DCI 0_1 and DCI 0_2 addressed by C-RNTI |
| 24 | downlink_PUSCH_UE_pdcch_configured | scheduling of PUSCH via configured grant | DCI 0_0 and DCI 0_1 and DCI 0_2 addressed by CS-RNTI |
| 25 | downlink_PDSCH_UE_pdcch_dynamic | scheduling of PDSCH via dynamic grant | DCI 1_0 and DCI 1_1 and DCI 1_2 addressed by C-RNTI |
| 26 | downlink_PDSCH_UE_pdcch_configured | scheduling of PDSCH via configured grant | DCI 1_0 and DCI 1_1 and DCI 1_2 addressed by CS-RNTI |
| 27 | downlink_PDSCH_UE_pdsch_dynamic | downlink TB transmission via dynamic scheduling | PDSCH carrying DTCH or DCCH |
| 28 | downlink_PDSCH_UE_pdsch_configured | downlink TB transmission via configured assignment (SPS) | PDSCH carrying DTCH or DCCH |
| 29 | downlink_broadcast_group_pdsch | downlink TB transmission for MBS broadcasting | PDSCH carrying MCCH or MTCH |
| 30 | downlink_multicast_group_pdsch | downlink TB transmission for MBS multicasting | PDSCH carrying MCCH or MTCH |
| 31 | uplink_sounding_reference_periodic | sounding reference signal | Such as P-SRS |
| 32 | uplink_sounding_reference_semi_persistent | sounding reference signal | Such as SP-SRS |
| 33 | uplink_sounding_reference_aperiodic | sounding reference signal | Such as AP SRS |
| 34 | uplink_csi_reporting_pucch_periodic | CSI reporting | P-CSI reporting on PUCCH |
| 35 | uplink_csi_reporting_pusch_semi_persistent | CSI reporting | SP-CSI reporting on PUSCH |
| 36 | uplink_csi_reporting_pucch_aperiodic | CSI reporting | AP-CSI reporting on PUSCH |
| 37 | uplink_harq_feedback_pucch | HARQ feedback | HARQ feedback |
| 38 | uplink_sr_pucch | Scheduling Request | Scheduling Request on PUCCH |
| 39 | uplink_prach | random access | Preamble/Msg1 |
| 40 | uplink_pusch_dynamic | uplink TB transmission via dynamic grant | PUSCH carrying DTCH or DCCH or CCCH |
| 41 | uplink_pusch_configured | uplink TB transmission via configured grant | PUSCH carrying DTCH or DCCH or CCCH |

TABLE 1-continued

| index | Name | related to | Note |
|---|---|---|---|
| 42 | sidelink_pscch | scheduling of PSSCH | resource and other transmission parameters used by a UE for PSSCH |
| 43 | sidelink_pssch | transmission of the sidelink TBs | transmission of the TBs |
| 44 | sidelink_psfch | HARQ feedback over the sidelink | HARQ feedback |
| 45 | sidelink_sync_reference | sidelink channel estimation | sidelink primary and sidelink secondary synchronization signals and Physical Sidelink Broadcast Channel |

DRX1 being configured for a UE means drx_period_1/dtx_period_1 and drx_period_2/dtx_period_2 occurs alternatively for the UE. DRX1 being released for a UE means only drx_period_1/dtx_period_1 occurs for the UE.

DRX2 being activated for a serving cell of a UE means drx_period_3 and drx_period_4 occurs alternatively and periodically in the serving cell of the UE. DRX2 being deactivated for a serving cell of a UE means only drx_period_3 occurs in the serving cell for the UE.

DTX2 being activated for a serving cell of a UE means dtx_period_3 and dtx_period_4 occurs alternatively and periodically in the serving cell of the UE. DTX2 being deactivated for a serving cell of a UE means only dtx_period_3 occurs in the cell for the UE.

DRX1 and DTX1 are defined per UE and applied to all active serving cells of the UE. GNB transmits and receives downlink common signals and uplink common signals normally during drx_period_2 and dtx_period_2 respectively when DRX1 and DTX1 are applied. DRX1 and DTX1 are also called C-DRX (Connected DRX). Active serving cells include PCell and activated SCells.

DRX2 and DTX2 are defined per cell and applied to a specific serving cell of a UE. GNB stops transmission and reception during drx_period_4 and dtx_period_4 respectively if DRX2 and DTX2 are applied (activated). In GNB perspective, GNB stops transmission in DRX2 operation and stops reception in DTX2 operation. Hence DRX2 and DTX2 are also called group DTX and group DRX.

In a UE perspective, DRX1 applies to downlinks of the active serving cells where DRX2 is not activated.

In a UE perspective, DTX1 applies to both uplinks (NUL and SUL) of the serving cells where DTX2 is not activated.

In a UE perspective, DRX2 applies to a downlink of a serving cell if DRX2 is activated for the serving cell and DRX1 is not configured.

In a UE perspective, DTX2 applies to NUL of a serving cell if DTX2 is activated for the NUL of the serving cell (DTX2 is configured for the NUL of the serving cell and DTX2 is activated for the serving cell) and DRX1 is not configured.

In a UE perspective, DTX2 applies to SUL of a serving cell if DTX2 is activated for the SUL of the serving cell (DTX2 is configured for the SUL of the serving cell and DTX2 is activated for the serving cell) and DRX1 is not configured.

In a UE perspective, DRX3 applies to a downlink of a serving cell if DRX2 is activated for the serving cell and DRX1 is configured.

In a UE perspective, DTX3 applies to NUL of a serving cell if DTX2 is activated for the NUL of the serving cell (DTX2 is configured for the NUL of the serving cell and DTX2 is activated for the serving cell) and DRX1 is configured.

In a UE perspective, DTX3 applies to SUL of a serving cell if DTX2 is activated for the SUL of the serving cell (DTX2 is configured for the SUL of the serving cell and DTX2 is activated for the serving cell) and DRX1 is configured.

In short, when DRX1 is configured for a UE and DRX2 is activated for a one or more serving cells, DRX3 is applied to the one or more serving cells and DRX1 is applied to other serving cells where DRX2 is not activated.

When DRX1 is not configured for a UE and DRX2 is activated for one or more serving cells, DRX2 is applied to the one or more serving cells and DRX is not applied to other serving cells where DRX2 is not activated.

When DRX1 is configured for a UE and DTX2 is activated for a one or two uplinks (NUL and/or SUL) of a one or more serving cells, DTX3 is applied to the one or two uplinks of the one or more serving cells and DTX1 is applied to the remaining uplink of the one or more serving cells and all uplinks of other serving cells where DTX2 is not activated.

For example, if DTX2 is activated for NUL of serving cell 1 and for SUL of serving cell_2, and if DTX2 is not activated for serving cell3, DTX3 is applied to the NUL of serving cell_1 and SUL of serving cell_2; DTX1 is applied to SUL of serving cell_1 and NUL of serving cell_2 and NUL of serving cell 3 and SUL of serving cell3.

When DRX1 is not configured for a UE and DTX2 is activated for a one or two uplinks (NUL and/or SUL) of a one or more serving cells, DTX2 is applied to the one or two uplinks of the one or more serving cells and DTX is not applied to the remaining uplink of the one or more serving cells and all uplinks of other serving cells where DTX2 is not activated.

For example, if DTX2 is activated for NUL of serving cell 1 and for SUL of serving cell_2, and if DTX2 is not activated for serving cell3, DTX2 is applied to the NUL of serving cell_1 and SUL of serving cell_2; DTX is not applied to SUL of serving cell_1 and NUL of serving cell_2 and NUL of serving cell 3 and SUL of serving cell3.

drx_period_1 is equal to DRX1 Active time (DRX1 ON period). dtx_period_1 is equal to DRX1 Active time (DRX1 ON period).

drx_period_2 is equal to DRX1 non-Active time (DRX1 OFF period). dtx_period_2 is equal to DRX1 non-Active time (DRX1 OFF period).

drx_period_3 is equal to DTX2 Active time (DTX2 ON period). dtx_period_3 is equal to DTX2 Active time (DTX2 ON period).

drx_period_4 is equal to DTX2 non-Active time (DTX2 OFF period). dtx_period_4 is equal to DTX2 non-Active time (DTX2 OFF period).

Table 2 below shows the signals GNB transmits and UE receives for DRX operation.

TABLE 2

|  | GNB Tx | UE Rx |
| --- | --- | --- |
| drx_period_1 | drx_signal_set_gnb_1 | drx_signal_set_ue_1 |
| drx_period_2 | drx_signal_set_gnb_2 | drx_signal_set_ue_2 |
| drx_period_3 | drx_signal_set_gnb_3 | drx_signal_set_ue_3 |
| drx_period_4 | drx_signal_set_gnb_4 | drx_signal_set_ue_4 |
| drx_period_A | drx_signal_set_gnb_a | drx_signal_set_ue_a |
| drx_period_B | drx_signal_set_gnb_b | drx_signal_set_ue_b |
| drx_period_C | drx_signal_set_gnb_c | drx_signal_set_ue_c |
| drx_period_D | drx_signal_set_gnb_d | drx_signal_set_ue_d |

Table 3 below shows the signals GNB receives and UE transmits for DTX operation.

TABLE 3

|  | GNB Rx | UE Tx |
| --- | --- | --- |
| dtx_period_1 | dtx_signal_set_gnb_1 | dtx_signal_set_ue_1 |
| dtx_period_2 | dtx_signal_set_gnb_2 | dtx_signal_set_ue_2 |
| dtx_period_3 | dtx_signal_set_gnb_3 | dtx_signal_set_ue_3 |
| dtx_period_4 | dtx_signal_set_gnb_4 | dtx_signal_set_ue_4 |
| drx_period_A | drx_signal_set_gnb_a | drx_signal_set_ue_a |
| drx_period_B | drx_signal_set_gnb_b | drx_signal_set_ue_b |
| drx_period_C | drx_signal_set_gnb_c | drx_signal_set_ue_c |
| drx_period_D | drx_signal_set_gnb_d | drx_signal_set_ue_d |

Figure 1C:
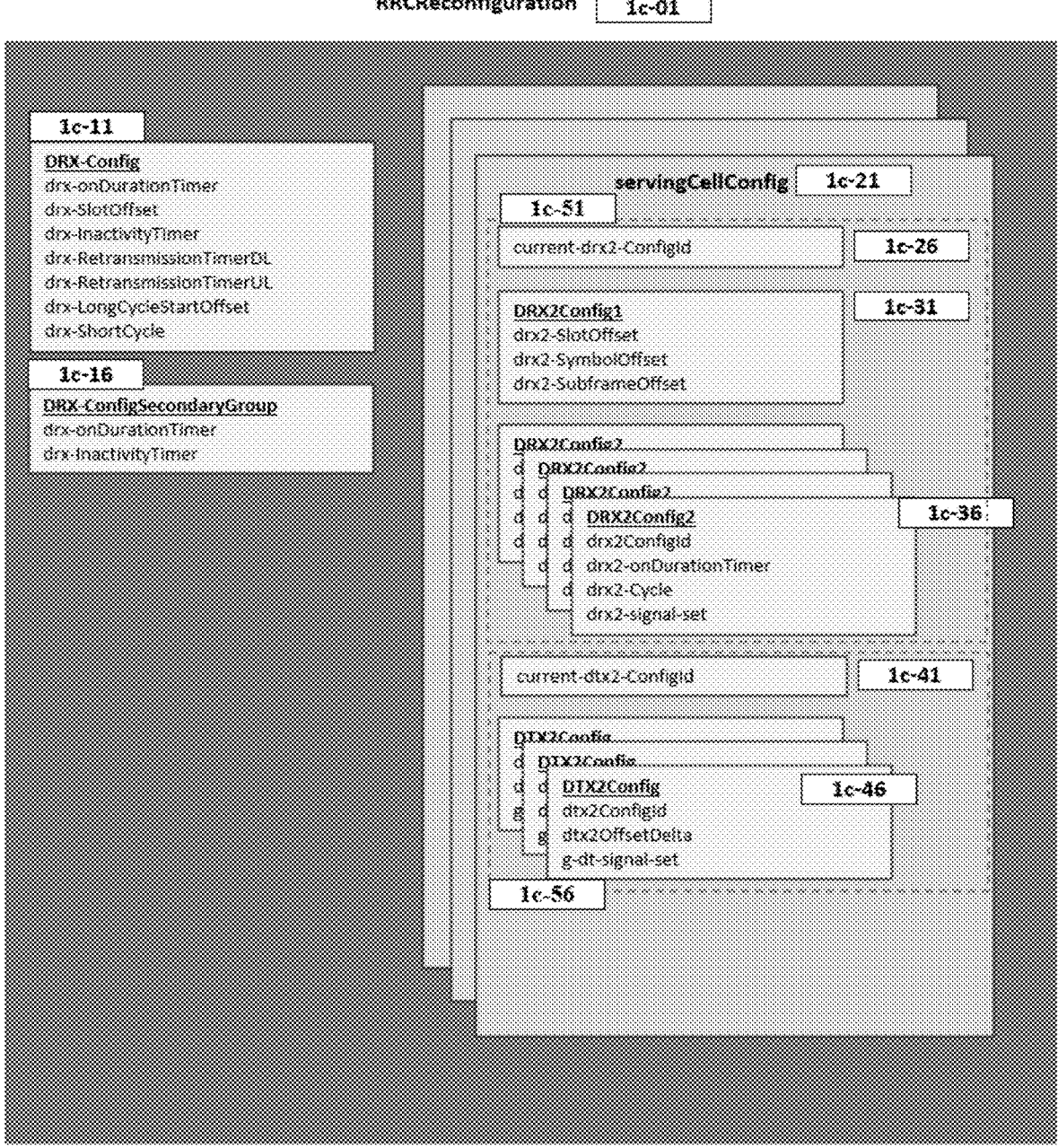
FIG. 1c is a diagram illustrates parameters for DRX operation and DTX operation according to an embodiment of the present invention.

FIG. 1c illustrates parameters for DRX operation and DTX operation.

Parameters for DRX1 of primary DRX group are included in DRX-Config IE (1c-11). Parameters for DTX1 of primary DRX group are included in DRX-Config IE. Parameters for DRX1 of primary DRX group are applied to DTX1 operation of primary DRX group as well (same set of parameters are applied to DRX1 and DTX1).

Zero or one DRX-Config IE per cell group is indicated in a RRCReconfiguration message (1c-01). To configure DRX1 for a cell group (MCG or SCG), a DRX-Config IE is indicated for the cell group in a RRCReconfiguration message. DRX1 and DTX1 are configured when RRCReconfiguration including DRX-Config IE is received.

Parameters for DRX1 of secondary DRX group are included in DRX-ConfigSecondaryGroup IE (1c-16). Parameters for DTX1 of secondary DRX group are included in DRX-ConfigSecondaryGroup IE. Parameters for DRX1 of secondary DRX group are applied to DTX1 operation of secondary DRX group as well.

Zero or one DRX-ConfigSecondaryGroup IE per cell group is indicated in a RRCReconfiguration message.

Parameters for DRX2 of a serving cell are indicated in a drx2-Config1 IE (1c-31) and zero or one current-drx2-ConfigId (1c-26) and one or more drx2-Config2 IE (1c-36).

The drx2-Config1 IE indicates the starting point of DRX2 cycle (starting point of drx_period_3).

Each of the one or more drx2-Config2 IE indicates the length of the DRX2 cycle and the length of drx_period_3. One drx2-Config1 is common to the one or more drx2-Config2.

Zero or one current-drx2-ConfigId is indicated in a ServingCellConfig. If a current-drx2-ConfigId is indicated in a ServingCellConfig, DRX2 is activated for the corresponding serving cell upon configuration. The activated DRX2 is based on the drx2-Config2 indicated by current-drx2-ConfigId and drx2-Config1 of the serving cell. If a current-drx2-ConfigId is not indicated for a serving cell, DRX2 is not activated for the corresponding serving cell upon configuration.

ServingCellConfig is used to configure (add or modify) the UE with a serving cell. The parameters in a ServingCellConfig are mostly UE specific but partly also cell specific. Parameters for DTX2 of a serving cell are indicated in zero or one current-dtx2-ConfigId (1c-41) and one or more dtx2-Config IE (1c-46) and zero or one dtx2-uplinkInd.

If a current-dtx2-ConfigId is included in a ServingCellConfig and is not a specific value, DTX2 is activated for a specific uplink upon configuration. The activated DTX2 is based on the dtx2-Config indicated by current-dtx2-ConfigId.

If a current-dtx2-ConfigId is included in a ServingCellConfig and is a specific value, DTX2 is activated for a specific uplink upon configuration. The activated DTX2 is based on the currently activated DRX2 configuration (dtx_period_3 is same as currently applied drx_period_3.). The specific value is e.g. the lowest value or the highest value.

If a current-dtx2-ConfigId is not indicated for a serving cell, DTX2 is not activated upon configuration.

Alternatively, a dtx-drx-SyncInd field (single value of "TRUE") is optionally present in a serving cell to indicate whether time pattern of DTX2 of the serving cell is same as the time pattern of DRX2 of the serving cell. If this field is present, DTX2 parameters related to the time pattern is implicitly indicated by DRX2 parameters. (dtx_period_3 is same as currently applied drx_period_3. Or the starting time point of dtx_period_3 is equal to the starting time point of drx_period_3).

If dtx-drx-SyncInd is present in a ServingCellConfig of a serving cell, DRX2 parameters for time pattern (periodicity and starting time point) are commonly applied to DTX2 of the serving cell. In this case, DTX2 parameters for time pattern (DTX2-Config) is not present in the ServingCellConfig of the serving cell.

The dtx2-uplinkInd is enumerated with two values of "SUL" and "both". The dtx2-uplinkInd indicates for which uplink DTX2 is activated for. The dtx2-uplinkInd is not present (while current-dtx2-ConfigId or dtx-drx-SyncInd is present), a specific uplink (NUL) is activated for DTX2. The specific uplink is the one that is not enumerated in the dtx2-uplinkInd field.

DRX-Config IE for DRX1 parameters comprises following parameters.

drx-onDurationTimer: the duration at the beginning of a DRX cycle; This parameter indicates a value in ms. This parameter determines the minimum length of drx_period_1 and dtx_period_1.

drx-SlotOffset: the delay before starting the drx-onDurationTimer; This parameter indicates a value in 1/32 ms.

drx-InactivityTimer: the duration after the PDCCH occasion in which a PDCCH indicates a new UL, DL or SL transmission; This parameter indicates a value in ms.

drx-RetransmissionTimerDL (per DL HARQ process except for the broadcast process): the maximum duration until a DL retransmission is received; This parameter indicates value in number of slot lengths of the BWP where the transport block was received.

drx-RetransmissionTimerUL (per UL HARQ process): the maximum duration until a grant for UL retransmission is received; This parameter indicates value in number of slot lengths of the BWP where the transport block was transmitted.

drx-LongCycleStartOffset: the Long DRX cycle and drx-StartOffset which defines the subframe where the Long and Short DRX cycle starts;

drx-ShortCycle (optional): the Short DRX cycle; This parameter indicates a value in ms.

DRX-ConfigSecondaryGroup IE comprises parameters for drx-onDurationTimer and drx-InactivityTimer.

Serving Cells of a UE may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-Retransmission TimerUL, drx-LongCycleStartOffset, drx-ShortCycle, drx-ShortCycleTimer, drx-HARQ-RTT-TimerDL and drx-HARQ-RTT-TimerUL.

If secondaryDRX-GroupConfig field is set to "true" in SCellConfig, the corresponding SCell belongs to the secondary DRX group.

If secondaryDRX-GroupConfig field is absent in SCellConfig, the corresponding SCell belongs to the primary DRX group.

PCell belongs to the primary DRX group.

DRX2Config1 IE for DRX2 parameters comprises following fields.

drx2-SlotOffset field comprises a value indicating the delay before starting the drx2-onDurationTimer; This parameter indicates a number of the slots of a specific DL BWP. The specific DL BWP is initial DL BWP of the serving cell.

drx2-SymbolOffset field comprises a value indicating the delay before starting the drx2-onDurationTimer; This parameter indicates a number of the symbols of the specific DL BWP.

drx2-SubframeOffset field indicates the subframe where DRX cycle of DRX2 operation starts. For each DRX2 cycle (indicated by drx2-Cycle), a drx_period_3 occurs and then a drx_period_4 occurs.

DRX2Config2 IE for DRX2 parameters comprises following fields.

drx2ConfigId field comprises an identifier of the DRX2 parameter set.

drx2-onDurationTimer field comprises value indicating the duration at the beginning of a DRX2 cycle; This parameter indicates a value in ms. Alternatively, this parameter indicates a value in number of symbols (number of slots) of a specific DL BWP. The specific DL BWP is initial DL BWP of the serving cell. This parameter determines the length of drx_period_3 when DRX2 is activated.

drx2-Cycle field indicates the length of the DRX cycle of DRX2 operation.

drx2-signal-set field indicates which downlink signals are received during drx_period_4. This field includes a integer. Integer 0 corresponds to downlink_signal_set_0. Integer 1 corresponds to downlink_signal_set_1 and so on. For example, downlink_signal_set_0 concerns reference signals and includes downlink_synch & downlink_demodulation_reference, downlink_signal_set_1 concerns sidelink signals and downlink_NR_Sidelink_UE_pdcch_dynamic includes & downlink_NR_Sidelink_UE_pdcch_configured and so on.

DTX2-Config IE for DTX2 parameters comprises following fields.

DTX2-ConfigId field comprises an identifier of the DTX2 parameter set.

dtx2OffsetDelta field comprises a value indicating the delta/difference/distance between a starting point of a drx_period_3 and a starting point of a dtx_period_3. Alternatively, dtx2OffsetDelta field comprises a value indicating the delta/difference/distance between a starting point of a drx_period_4 and a starting point of a dtx_period_4. If this field is absent, the starting point of dtx_period_3 and drx_period_3 are same.

The length of the DTX2 cycle is same as the length of DRX cycle of a specific DRX2Config2. The specific DRX2Config2 is the currently active one.

The length of dtx_period_3 is same as the length of the current drx_period_3.

dtx2-signal-set field indicates which uplink signals are transmitted during dtx_period_4. This field includes a integer. Integer 0 corresponds to uplink_signal_set_0. Integer 1 corresponds to uplink_signal_set_1 and so on.

The RRCReconfiguration includes a DRX1 configuration (DRX-Config IE) and one or more serving cell configurations. Configuration of a serving cell is indicated by a ServingCellConfig IE.

The ServingCellConfig IE (1c-21) optionally includes a DRX2-Config IE(1c-51). The DRX2-Config IE optionally includes current-drx2-ConfigId field. The DRX2-Cofnig IE mandatorily includes DRX2Config1 IE and one or more DRX2Config2 IEs.

The ServingCellConfig IE optionally includes a DTX2-Config IE(1c-56). The DTX2-Config IE optionally includes current-dtx2-ConfigId field. The DTX2-Config IE optionally includes a dtx-drx-SyncInd field. The DTX2-Config IE optionally includes one or more DTX2Config IEs.

The ServingCellConfig IE includes a PDCCH-ServingCellConfig IE. The PDCCH-ServingCellConfig IE is used to configure UE specific PDCCH parameters applicable across specific downlink bandwidth parts of a serving cell. The specific downlink bandwidth parts are those where common search space is configured.

The PDCCH-ServingCellConfig IE includes a D-RNTI IE. D-RNTI IE includes a RNTI value for D-RNTI.

The ServingCellConfig IE includes one or more BWP-Downlink IEs and one or more BWP-Uplink IEs.

A BWP-Downlink IE includes a one or more SerachSpace IE. The SearchSpace IE includes a SearchSpaceId IE and a searchSpaceType field. The searchSpaceType field includes either parameters for common search space or parameters for UE specific search space.

A BWP-Downlink IE optionally includes a searchSpace-DRX2 field. The searchSpaceDRX2 field includes a SerachSpaceId IE. searchSpaceDRX2 field indicates a SearchSpaceId of a common search space. The searchSpaceDRX2 field indicates the ID of the search space for monitoring DRX2_DTX2_COMMAND MAC CE.

A UE monitors PDCCH candidates in one or more of the following search spaces sets during drx_period_1 or drx_period_3 or drx_period_A.

1: on SpCell, UE monitors PDCCH candidates configured by followings.

CSS set configured by searchSpaceOtherSystemInformation in PDCCH-ConfigCommon for a DCI format 1_0 with CRC scrambled by a SI-RNTI.

CSS set configured by ra-SearchSpace in PDCCH-ConfigCommon for a DCI format 1_0 with CRC scrambled by a RA-RNTI, a MsgB-RNTI, or a TC-RNTI CSS set configured by pagingSearchSpace in PDCCH-ConfigCommon for a DCI format 1_0 with CRC scrambled by a P-RNTI CSS set configured by peiSearchSpace in DownlinkConfigCommonSIB for a DCI format 2_7 with CRC scrambled by a PEI-RNTI CSS set configured by SearchSpace in PDCCH-Config with searchSpaceType=common for DCI formats with CRC scrambled by PS-RNTI 2: on active serving cells, UE monitors PDCCH candidates configured by followings.

CSS set configured by SearchSpace in PDCCH-ConfigMulticast for DCI formats with CRC scrambled by G-RNTI, or G-CS-RNTI 3: on first specific serving cells, UE monitors PDCCH candidates configured by followings.

CSS set configured by searchSpaceDRX2 in PDCCH-ConfigCommon of ServingCellConfig of the first specific serving cell, for DCI format 1_0 with CRC scrambled D-RNTI. The D-RNTI is indicated in PDCCH-ServingCellConfig of ServingCellConfig of the first specific serving cell. The first specific serving cells comprise currently active serving cells with configured searchSpaceDRX2 (or DRX2 configured or DTX2 configured). Active serving cells comprises SpCell and active SCells.

4: on active serving cells, UE monitors PDCCH candidates configured by followings.

a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), SL-RNTI, or SL-CS-RNTI DRX2_DTX2_COMMAND is a second type MAC CE included in a second type MAC PDU.

A second type MAC PDU includes (carries) only second type MAC CE and second type MAC SDU. The second type MAC PDU includes neither first type MAC CE nor first type MAC SDU.

A first type MAC PDU includes (carries) only first type MAC CE and first type MAC SDU. The first type MAC PDU includes neither second type MAC CE nor second type MAC SDU.

Second type MAC CE is MAC CE transmitted to and received by one or more specific UEs. Second type MAC SDU is MAC SDU transmitted to and received by one or more specific UEs.

Frist type MAC CE is MAC CE transmitted to and received by a specific UE. Frist type MAC SDU is MAC SDU transmitted to and received by a specific UE.

The MAC PDU including (carrying) DRX2_DTX2_COMMAND is transmitted to and received by a one or more UEs. The one or more UEs are configured with a same D-RNTI.

DRX2_DTX2_COMMAND comprises following fields.

A/D_DRX2: This field indicates whether to activate or deactivate a DRX2 configuration (parameters); The field is set to 1 to indicate activation, otherwise it indicates deactivation;

DRX2_ID: This field indicates the DRX2 configuration (parameters) identified by drx2ConfigId field in the drx2Config2 IE of the corresponding serving cell and drx2Config1 IE of the corresponding serving cell. A specific value indicates no activation and no deactivation (currently active DRX2 configuration remains active).

Serving_Cell_DRX2: This field indicates the serving cell corresponding to the activated or deactivated DRX2 configuration. If this field is absent, the corresponding serving cell is the serving cell where DRX2_DTX2_COMMAND is received.

A/D_DTX2: This field indicates whether to activate or deactivate indicated DTX2 configuration (parameters); The field is set to 1 to indicate activation, otherwise it indicates deactivation.

DTX2_ID: This field indicates the DTX2 configuration (parameters) identified by dtx2ConfigId field in the dtx2Config IE of the corresponding serving cell. A specific value indicates no activation and no deactivation (currently active DTX2 configuration remains active).

Serving_Cell_DTX2: This field indicates the serving cell corresponding to the activated or deactivated DTX2 configuration. If this field is absent, the corresponding serving cell is the serving cell indicated by Serving_Cell_DRX2. Alternatively, if this field is absent, the corresponding serving cell is the serving cell where DRX2_DTX2_COMMAND is received.

SUL_indicator: This field indicates whether the activated or deactivated DTX2 configuration is applied to SUL or NUL or both. This field is set to 01 to indicate SUL. This field is set to 00 to indicate NUL. This field is set to 10 to indicates both uplinks. Alternatively, it could be 2 bit bitmap, the first bit corresponds to NUL and the second bit corresponds to SUL.

Figure 1D:
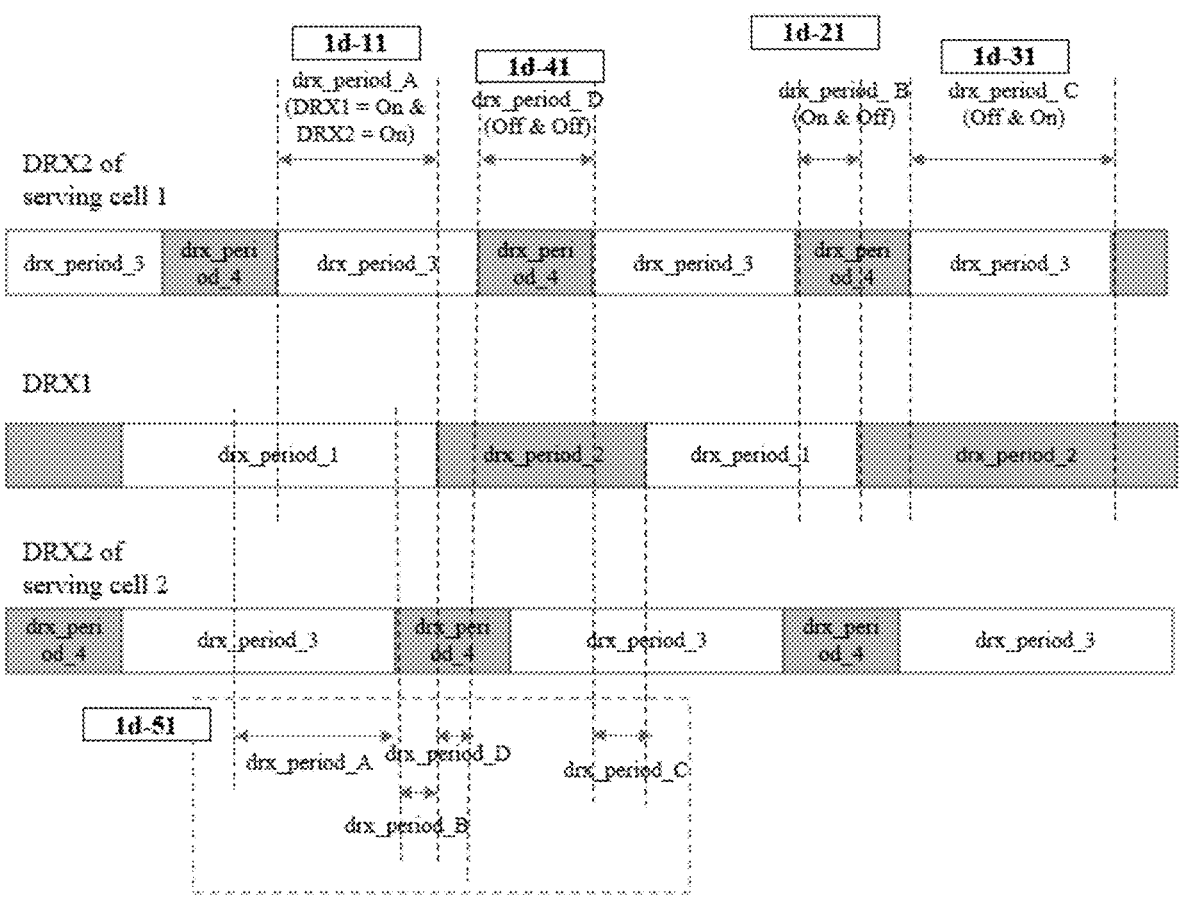
FIG. 1d is a diagram illustrating DRX periods and DRX operations.

FIG. 1d illustrates DRX periods and DRX operations.

When DRX1 is configured for a cell group of a UE, the drx_period_1 for Serving Cells in a DRX group includes followings:

1: time whitle drx-onDuration Timer or drx-Inactivity Timer configured for the DRX group is running; or 2: time while drx-RetransmissionTimerDL, drx-RetransmissionTimerUL or drx-RetransmissionTimerSL is running on any Serving Cell in the DRX group; or 3: time while ra-ContentionResolutionTimer or msgB-Response Window is running; or 4: time while a Scheduling Request is sent on PUCCH and is pending; or 5: time while a PDCCH indicating a new transmission addressed to the C-RNTI of the MAC entity has not been received after successful reception of a Random Access Response for the Random Access Preamble not selected by the MAC entity among the contention-based Random Access Preamble.

When DRX1 is configured for the cell group of the UE, the drx_period_2 for Serving Cells in the DRX group is the time that is not drx_period_1.

When DRX1 is configured for the cell group of the UE, the dtx_period_1 for Serving Cells in the DRX group and the drx_period_1 for Serving Cells in the same DRX group are same.

When DRX1 is configured for the cell group of the UE, the dtx_period_2 for Serving Cells in the DRX group and the drx_period_2 for Serving Cells in the same DRX group are same.

DRX1 is configured for the cell group of the UE if UE is configured with DRX-Config for the cell group (UE has received RRCReconfiguration containing DRX-Config IE for the cell group).

UE starts drx-onDurationTimer after drx-SlotOffset from the beginning of a specific subframe. The specific subframe occurs every drx-LongCycle and is determined based on drx-StartOffset and SFN of SpCell and subframe number of SpCell.

UE starts drx-onDurationTimer for this DRX group after drx-SlotOffset from the beginning of the subframe. The subframe fulfills following equation.

[(SFN×10)+subframe number] modulo (drx-ShortCycle)=(drx-StartOffset) modulo (drx-Short-Cycle) or

[(SFN×10)+subframe number] modulo (drx-LongCycle)=drx-StartOffset

UE starts drx-InactivityTimer for this DRX group in the first symbol after the end of the PDCCH reception if PDCCH indicating a new transmission is received.

UE starts drx-RetransmissionTimerDL for the corresponding HARQ process if the data of the corresponding HARQ process was not successfully decoded.

The length of drx-onDurationTimer is determined based on the value indicated in drx-onDurationTimer field of the DRX-Config.

Table 4 lists behaviour of GNB and UE in DRX1.

TABLE 4

| index | Signal | drx_period_1 GNB | drx_period_1 UE | drx_period_2 GNB | drx_period_2 UE |
|---|---|---|---|---|---|
| 1 | downlink_synch | tx | rx | tx | not rx |
| 2 | downlink_csi_reference | tx | rx | tx | not rx |
| 3 | downlink_demodulation_reference | tx | rx | tx | not rx |
| 4 | downlink_phase_tracking_reference | tx | rx | tx | not rx |
| 5 | downlink_positioning_reference | tx | rx | tx | rx |
| 6 | downlink_si_common_pdcch | tx | rx | tx | not rx |
| 7 | downlink_si_common_pdsch | tx | rx | tx | not rx |
| 8 | downlink_paging_common_pdcch | tx | rx | tx | not rx |
| 9 | downlink_paging_common_pdsch | tx | rx | tx | not rx |
| 10 | downlink_random_access_common_pdcch | tx | rx | tx | rx |
| 11 | downlink_random_access_common_pdsch | tx | rx | tx | rx |
| 12 | downlink_TPC_SRS_group_pdcch | tx | rx | tx | not rx |
| 13 | downlink_Cancel_UE_pdcch | tx | rx | not tx | not rx |
| 14 | downlink_availability_UE_pdcch | tx | rx | not tx | not rx |
| 15 | downlink_power_saving_group_pdcch | not tx | not rx | tx | rx |
| 16 | downlink_pei_group_pdcch | tx | rx | tx | not rx |
| 17 | downlink_NR_Sidelink_UE_pdcch_dynamic | tx | rx | not tx | not rx |
| 18 | downlink_NR_Sidelink_UE_pdcch_configured | tx | rx | not tx | not rx |
| 19 | downlink_LTE_Sidelink_UE_pdcch_configured | tx | rx | not tx | not rx |
| 20 | downlink_broadcast_group_pdcch_dynamic | tx | rx | tx | rx |
| 21 | downlink_broadcast_group_pdsch | tx | rx | tx | rx |
| 22 | downlink_multicast_group_pdcch_configured | tx | rx | tx | rx |
| 23 | downlink_multicast_group_pdcch_dynamic | tx | rx | tx | rx |
| 24 | downlink_multicast_group_pdsch | tx | rx | tx | rx |
| 25 | downlink_PDSCH_UE_pdcch_dynamic | tx | rx | not tx | not rx |
| 26 | downlink_PDSCH_UE_pdsch_dynamic | tx | rx | not tx | not rx |
| 27 | downlink_PDSCH_UE_pdcch_configured | tx | rx | not tx | not rx |
| 28 | downlink_PDSCH_UE_pdsch_configured | tx | rx | tx | rx |
| 29 | downlink_PUSCH_UE_pdcch_dynamic | tx | rx | not tx | not rx |
| 30 | downlink_PUSCH_UE_pdcch_configured | tx | rx | not tx | not rx |
| 42 | sidelink_pscch | N/A | rx | N/A | rx |
| 43 | sidelink_pssch | N/A | rx | N/A | rx |
| 44 | sidelink_psfch | N/A | rx | N/A | rx |
| 45 | sidelink_sync_reference | N/A | rx | N/A | rx |

"rx" means either "receiving" or "measuring" depending on circumstances.

The signals denoted with "tx" in GNB column of drx_period_1 belong to drx_signal_set_gnb_1.

The signals denoted with "tx" in GNB column of drx_period_2 belong to drx_signal_set_gnb_2.

The signals denoted with "rx" in UE column of drx_period_1 belong to drx_signal_set_ue_1.

The signals denoted with "rx" in UE column of drx_period_2 belong to drx_signal_set_ue_2.

Table 5 lists behaviour of GNB and UE in DTX1.

TABLE 5

| index | Signal | dtx_period_1 GNB | dtx_period_1 UE | dtx_period_2 GNB | dtx_period_2 UE |
|---|---|---|---|---|---|
| 31 | uplink_sounding_reference_periodic | rx | tx | not rx | not tx |
| 32 | uplink_sounding_reference_semi_persistent | rx | tx | not rx | not tx |
| 33 | uplink_sounding_reference_aperiodic | rx | tx | rx | tx |
| 34 | uplink_csi_reporting_pucch_periodic | rx | tx | not rx | not tx |
| 35 | uplink_csi_reporting_pusch_semi_persistent | rx | tx | not rx | not tx |
| 36 | uplink_csi_reporting_pusch_aperiodic | rx | tx | rx | tx |
| 37 | uplink_harq_feedback_pucch | rx | tx | rx | tx |
| 38 | uplink_sr_pucch | rx | tx | rx | tx |

TABLE 5-continued

|  |  | dtx_period_1 | | dtx_period_2 | |
|---|---|---|---|---|---|
| index | Signal | GNB | UE | GNB | UE |
| 39 | uplink_prach | rx | tx | rx | tx |
| 40 | uplink_pusch_dynamic | rx | tx | not rx | not tx |
| 41 | uplink_pusch_configured | rx | tx | rx | tx |
| 42 | sidelink_pscch | N/A | tx | N/A | tx |
| 43 | sidelink_pssch | N/A | tx | N/A | tx |
| 44 | sidelink_psfch | N/A | tx | N/A | tx |
| 45 | sidelink_sync_reference | N/A | tx | N/A | tx |

The signals denoted with "rx" in GNB column of dtx_period_1 belong to dtx_signal_set_gnb_1.

The signals denoted with "rx" in GNB column of dtx_period_2 belong to dtx_signal_set_gnb_2.

The signals denoted with "tx" in UE column of drx_period_1 belong to dtx_signal_set_ue_1.

The signals denoted with "tx" in UE column of drx_period_2 belong to dtx_signal_set_ue_2.

When DRX2 is configured and activated for a serving cell of a UE, the drx_period_3 for the serving cell is time whitle drx2-onDurationTimer of the serving cell is running.

When DRX2 is configured and activated for the serving cell of the UE, the drx_period_4 for the serving cell is the time that is not drx_period_3 of the serving cell (or when drx2-onDurationTimer of the serving cell is not running).

DRX2 is configured for a serving cell of UE if UE is configured with a DRX2Config1 IE and at least one DRX2Config2 IE for the serving cell (UE has received RRCReconfiguration containing servingCellConfig containing a DRX2Config1 and one or more DRX2Config2).

DRX2 of a serving cell is activated and deactivated in conjunction with the state of the serving cell as below.

DRX2 is activated for a serving cell of UE when UE receives a DRX2_DTX2_COMMAND activating DRX2 for the serving cell and if the serving cell is active.

DRX2 is activated for a serving cell of UE when UE receives a RRCReconfiguration containing a current-drx2-ConfigId field and if the serving cell is active.

DRX2 is deactivated for a serving cell of UE when UE receives a DRX2_DTX2_COMMAND deactivating DRX2 for the serving cell and if the serving cell is active.

DRX2 is deactivated for a serving cell when UE receives a MAC CE deactivating the serving cell.

DRX2 is deactivated for a serving cell when the serving cell is deactivated due to expiry of sCellDeactivation Timer.

Alternatively, DRX2 of a serving cell is activated and deactivated independently from the states of the serving cell as below.

DRX2 is activated for a serving cell of UE when UE receives a DRX2_DTX2_COMMAND activating DRX2 for the serving cell.

DRX2 is activated for a serving cell of UE when UE receives a RRCReconfiguration containing a current-drx2-ConfigId field.

DRX2 is deactivated for a serving cell of UE when UE receives a DRX2_DTX2_COMMAND deactivating DRX2.

UE starts drx2-OnDurationTimer for a serving cell after drx2-SymbolOffset from the beginning of a specific slot of the serving cell. The specific slot starts after drx2-SlotOffset from the beginning of a specific subframe of the SpCell.

The specific subframe of the serving cell occurs every drx2-Cycle. The specific subframe of the serving cell is determined based on drx2-SubframeOffset and drx2-Cycle and SFN of the SpCell and subframe number of the SpCell.

[(SFN×10)+subframe number] modulo (drx2-Cycle)=drx-SubframeOffset

The serving cell is either SpCell or SCell. SFN of SpCell is used to determine the starting point of drx_period_3 of a serving cell. SCS of the serving cell is used to determine the length of the drx_period_3.

The length of drx2-onDurationTimer is determined based on the value indicated in drx2-onDurationTimer field of the corresponding drx2-Config2 IE.

Table 6 lists behaviour of GNB and UE in DRX2 in active serving cell.

TABLE 6

|  |  | drx_period_3 | | drx_period_4 | |
|---|---|---|---|---|---|
| index | Signal | GNB | UE | GNB | UE |
| 1 | downlink_synch | tx | rx | cnfg | cnfg |
| 2 | downlink_csi_reference | tx | rx | cnfg | cnfg |
| 3 | downlink_demodulation_reference | tx | rx | cnfg | cnfg |
| 4 | downlink_phase_tracking_reference | tx | rx | cnfg | cnfg |
| 5 | downlink_positioning_reference | tx | rx | not tx | not rx |
| 6 | downlink_si_common_pdcch | tx | rx | not tx | not rx |
| 7 | downlink_si_common_pdsch | tx | rx | not tx | not rx |
| 8 | downlink_paging_common_pdcch | tx | rx | not tx | not rx |
| 9 | downlink_paging_common_pdsch | tx | rx | not tx | not rx |
| 10 | downlink_random_access_common_pdcch | tx | rx | not tx | not rx |
| 11 | downlink_random_access_common_pdsch | tx | rx | not tx | not rx |
| 12 | downlink_TPC_SRS_group_pdcch | tx | rx | not tx | not rx |
| 13 | downlink_Cancel_UE_pdcch | tx | rx | not tx | not rx |
| 14 | downlink_availability_UE_pdcch | tx | rx | not tx | not rx |
| 15 | downlink_power_saving_group_pdcch | tx | rx | not tx | not rx |
| 16 | downlink_pei_group_pdcch | tx | rx | not tx | not rx |
| 17 | downlink_NR_Sidelink_UE_pdcch_dynamic | tx | rx | cnfg | cnfg |
| 18 | downlink_NR_Sidelink_UE_pdcch_configured | tx | rx | cnfg | cnfg |

TABLE 6-continued

| index | Signal | drx_period_3 | | drx_period_4 | |
|---|---|---|---|---|---|
| | | GNB | UE | GNB | UE |
| 19 | downlink_LTE_Sidelink_UE_pdcch_configured | tx | rx | cnfg | cnfg |
| 20 | downlink_broadcast_group_pdcch_dynamic | tx | rx | not tx | rx |
| 21 | downlink_broadcast_group_pdsch | tx | rx | not tx | rx |
| 22 | downlink_multicast_group_pdcch_configured | tx | rx | not tx | rx |
| 23 | downlink_multicast_group_pdcch_dynamic | tx | rx | not tx | rx |
| 24 | downlink_multicast_group_pdsch | tx | rx | not tx | rx |
| 25 | downlink_PDSCH_UE_pdcch_dynamic | tx | rx | not tx | not rx |
| 26 | downlink_PDSCH_UE_pdsch_dynamic | tx | rx | not tx | not rx |
| 27 | downlink_PDSCH_UE_pdcch_configured | tx | rx | not tx | not rx |
| 28 | downlink_PDSCH_UE_pdsch_configured | tx | rx | not tx | not rx |
| 29 | downlink_PUSCH_UE_pdcch_dynamic | tx | rx | not tx | not rx |
| 30 | downlink_PUSCH_UE_pdcch_configured | tx | rx | not tx | not rx |
| 42 | sidelink_pscch | N/A | rx | N/A | rx |
| 43 | sidelink_pssch | N/A | rx | N/A | rx |
| 44 | sidelink_psfch | N/A | rx | N/A | rx |
| 45 | sidelink_sync_reference | N/A | rx | N/A | rx |

"cnfg" menas reception of the corresponding signal is determined based on configuration information (such as drx2-signal-set field).

If the serving cell is deactivated, during drx_period_3, UE measures downlink_synch with a specific periodicity and measures downlink_positioning_reference with another specific periodicity and perform reception in sidelink. During drx_period_4, UE does not receive (measure) any downlink signal and perform reception in sidelink.

Table 7 lists behaviour of GNB and UE in DRX2 in deactivated serving cell.

TABLE 7

DRX2 in deactivated serving cell

| index | Signal | drx_period_3 | | drx_period_4 | |
|---|---|---|---|---|---|
| | | GNB | UE | GNB | UE |
| 1 | downlink_synch | tx | rx | Cnfg | not rx |
| 2 | downlink_csi_reference | tx | not rx | Cnfg | not rx |
| 3 | downlink_demodulation_reference | tx | not rx | Cnfg | not rx |
| 4 | downlink_phase_tracking_reference | tx | not rx | Cnfg | not rx |
| 5 | downlink_positioning_reference | tx | rx | not tx | not rx |
| 6 | downlink_si_common_pdcch | tx | not rx | not tx | not rx |
| 7 | downlink_si_common_pdsch | tx | not rx | not tx | not rx |
| 8 | downlink_paging_common_pdcch | tx | not rx | not tx | not rx |
| 9 | downlink_paging_common_pdsch | tx | not rx | not tx | not rx |
| 10 | downlink_random_access_common_pdcch | tx | not rx | cnfg | not rx |
| 11 | downlink_random_access_common_pdsch | tx | not rx | cnfg | not rx |
| 12 | downlink_TPC_SRS_group_pdcch | tx | not rx | cnfg | not rx |
| 13 | downlink_Cancel_UE_pdcch | tx | not rx | cnfg | not rx |
| 14 | downlink_availability_UE_pdcch | tx | not rx | not tx | not rx |
| 15 | downlink_power_saving_group_pdcch | tx | not rx | not tx | not rx |
| 16 | downlink_pei_group_pdcch | tx | not rx | not tx | not rx |
| 17 | downlink_NR_Sidelink_UE_pdcch_dynamic | tx | not rx | cnfg | not rx |
| 18 | downlink_NR_Sidelink_UE_pdcch_configured | tx | not rx | cnfg | not rx |
| 19 | downlink_LTE_Sidelink_UE_pdcch_configured | tx | not rx | cnfg | not rx |
| 20 | downlink_broadcast_group_pdcch_dynamic | tx | not rx | not tx | not rx |
| 21 | downlink_broadcast_group_pdsch | tx | not rx | not tx | not rx |
| 22 | downlink_multicast_group_pdcch_configured | tx | not rx | not tx | not rx |
| 23 | downlink_multicast_group_pdcch_dynamic | tx | not rx | not tx | not rx |
| 24 | downlink_multicast_group_pdsch | tx | not rx | not tx | not rx |
| 25 | downlink_PDSCH_UE_pdcch_dynamic | tx | not rx | not tx | not rx |
| 26 | downlink_PDSCH_UE_pdsch_dynamic | tx | not rx | not tx | not rx |
| 27 | downlink_PDSCH_UE_pdcch_configured | tx | not rx | not tx | not rx |
| 28 | downlink_PDSCH_UE_pdsch_configured | tx | not rx | not tx | not rx |
| 29 | downlink_PUSCH_UE_pdcch_dynamic | tx | not rx | not tx | not rx |
| 30 | downlink_PUSCH_UE_pdcch_configured | tx | not rx | not tx | not rx |
| 42 | sidelink_pscch | N/A | rx | N/A | rx |
| 43 | sidelink_pssch | N/A | rx | N/A | rx |
| 44 | sidelink_psfch | N/A | rx | N/A | rx |
| 45 | sidelink_sync_reference | N/A | rx | N/A | rx |

The signals denoted with "tx" in GNB column of dix_period_3 belong to drx_signal_set_gnb_3.

The signals denoted with "tx" in GNB column of drx_period_4 belong to drx_signal_set_gnb_4.

The signals denoted with "rx" in UE column of drx_period_3 belong to drx_signal_set_ue_3.

The signals denoted with "rx" in UE column of drx_period_4 belong to drx_signal_set_ue_4.

The signals denoted with "cnfg" in UE column of drx_period_4 belong to drx_signal_set_ue_4 if the corresponding signal is configured to be received during drx_period_4.

When DTX2 is configured and activated for a serving cell of a UE, the dtx_period_3 for the serving cell includes followings:

1: time whitle dtx2-onDurationTimer of the serving cell is running.

When DTX2 is configured for the serving cell of the UE, the dtx_period_4 for the serving cell is the time that is not dtx_period_3 of the serving cell. dtx_period_4 for the serving cell starts when dtx_period_3 for the serving cell ends.

DTX2 is configured for a serving cell of UE if UE is configured with a DTX2-Config IE for the serving cell (UE has received RRCReconfiguration containing servingCellConfig containing a DTX2-Config).

DTX2 is configured for a serving cell of UE if UE is configured with a current-dtx2-ConfigId set to a specific value. (UE has received RRCReconfiguration containing servingCellConfig containing a current-dtx2-ConfigId set to a specific value).

DTX2 is deactivated for a serving cell of UE when UE receives a DRX2_DTX2_COMMAND deactivating DTX2 for the serving cell and if the serving cell is active.

DTX2 is deactivated for a serving cell when UE receives a DRX2_DTX2_COMMAND deactivating the serving cell.

DTX2 is deactivated for a serving cell when the serving cell is deactivated due to expiry of sCellDeactivation Timer.

Alternatively, DTX2 of a serving cell is activated and deactivated independently from the state of the serving cell as below.

DTX2 is activated for a serving cell of UE when UE receives a DRX2_DTX2_COMMAND activating DTX2 for the serving cell.

DTX2 is activated for a serving cell of UE when UE receives a RRCReconfiguration containing a current-dtx2-ConfigId field.

DTX2 is deactivated for a serving cell of UE when UE receives a DRX2_DTX2_COMMAND deactivating DTX2 for the serving cell.

UE starts dtx2-OnDurationTimer for a serving cell after dtx2OffsetDelta from the start of dtx2-OnDurationTimer of the associated DRX2.

Currently active (applied) DTX2 of a serving cell is associated with currently active (applied) DRX2 of the serving cell.

The length of dtx2-onDurationTimer is determined based on the value indicated in drx2-onDurationTimer field of the drx2-Config2 IE of the associated DRX2.

Table 8 lists behaviour of GNB and UE in DTX2 in active serving cell.

TABLE 8

| index | Signal | dtx_period_3 | | dtx_period_4 | |
|---|---|---|---|---|---|
| | | GNB | UE | GNB | UE |
| 31 | uplink_sounding_reference_periodic | rx | tx | not rx | not tx |
| 32 | uplink_sounding_reference_semi_persistent | rx | tx | not rx | not tx |
| 33 | uplink_sounding_reference_aperiodic | rx | tx | rx | tx |
| 34 | uplink_csi_reporting_pucch_periodic | rx | tx | not rx | not tx |
| 35 | uplink_csi_reporting_pusch_semi_persistent | rx | tx | not rx | not tx |
| 36 | uplink_csi_reporting_pusch_aperiodic | rx | tx | rx | tx |
| 37 | uplink_harq_feedback_pucch | rx | tx | not rx | not tx |
| 38 | uplink_sr_pucch | rx | tx | not rx | not tx |
| 39 | uplink_prach | rx | tx | not rx | not tx |
| 40 | uplink_pusch_dynamic | rx | tx | not rx | not tx |
| 41 | uplink_pusch_configured | rx | tx | not rx | not tx |
| 42 | sidelink_pscch | N/A | tx | N/A | tx |
| 43 | sidelink_pssch | N/A | tx | N/A | tx |
| 44 | sidelink_psfch | N/A | tx | N/A | tx |
| 45 | sidelink_sync_reference | N/A | tx | N/A | tx |

DTX2 is configured for a serving cell of UE if UE is configured with dtx-drx-SyncInd. (UE has received RRCReconfiguration containing servingCellConfig containing a dtx-drx-SyncInd).

DTX2 of a serving cell is activated and deactivated in conjunction with the state of the serving cell as below.

DTX2 is activated for a serving cell of UE when UE receives a DRX2_DTX2_COMMAND activating DTX2 for the serving cell and if the serving cell is active.

DTX2 is activated for a serving cell of UE when UE receives a RRCReconfiguration containing a current-dtx2-ConfigId field and if the serving cell is active.

The signals denoted with "rx" in GNB column of dtx_period_3 belong to dtx_signal_set_gnb_3.

The signals denoted with "rx" in GNB column of dtx_period_4 belong to dtx_signal_set_gnb_4.

The signals denoted with "tx" in UE column of dtx_period_3 belong to dtx_signal_set_ue_3.

The signals denoted with "tx" in UE column of dtx_period_4 belong to dtx_signal_set_ue_4.

If the serving cell is deactivated, during dtx_period_3 and during dtx_period_4, UE does not perform any uplink transmission and performs transmission in sidelink.

Table 9 lists behaviour of GNB and UE in DTX2 in deactivated serving cell.

TABLE 9

| index | Signal | dtx_period_3 | | dtx_period_4 | |
|---|---|---|---|---|---|
| | | GNB | UE | GNB | UE |
| 31 | uplink_sounding_reference_periodic | not rx | not tx | not rx | not tx |
| 32 | uplink_sounding_reference_semi_persistent | not rx | not tx | not rx | not tx |
| 33 | uplink_sounding_reference_aperiodic | not rx | not tx | not rx | not tx |
| 34 | uplink_csi_reporting_pucch_periodic | not rx | not tx | not rx | not tx |
| 35 | uplink_csi_reporting_pusch_semi_persistent | not rx | not tx | not rx | not tx |
| 36 | uplink_csi_reporting_pusch_aperiodic | not rx | not tx | not rx | not tx |
| 37 | uplink_harq_feedback_pucch | not rx | not tx | not rx | not tx |
| 38 | uplink_sr_pucch | not rx | not tx | not rx | not tx |
| 39 | uplink_prach | not rx | not tx | not rx | not tx |
| 40 | uplink_pusch_dynamic | not rx | not tx | not rx | not tx |
| 41 | uplink_pusch_configured | not rx | not tx | not rx | not tx |
| 42 | sidelink_pscch | N/A | tx | N/A | tx |
| 43 | sidelink_pssch | N/A | tx | N/A | tx |
| 44 | sidelink_psfch | N/A | tx | N/A | tx |
| 45 | sidelink_sync_reference | N/A | tx | N/A | tx |

In a single UE perspective, if DRX1 is configured for the UE and DRX2 is activated for a serving cell of the UE and the serving cell is active, a specific period of the serving cell is a combination of drx_period_x (x is 1 or 2) and drx_period_y (y is 3 or 4).

drx_period_A and drx_period_B and drx_period_C and drx_period_D are as followings in a serving cell. "overlap" and "collide" and "coincide" are used interchangeably.

drx_period_A (1d-11) of a serving cell 1 is the period during when drx_period_1 (DRX1 is ON period) of the serving cell 1's DRX group and drx_period_3 (DRX2 is ON period) of the serving cell 1 overlap.

drx_period_B (1d-21) of a serving cell 1 is the period during when drx_period_1 (DRX1 is ON period) of the serving cell 1's DRX group and drx_period_4 (DRX2 is OFF period) of the serving cell 1 overlap.

drx_period_C (1d-31) of a serving cell 1 is the period during when drx_period_2 (DRX1 is OFF period) of the serving cell 1' s DRX group and drx_period_3 (DRX2 is ON period) of the serving cell 1 overlap.

drx_period_D (1d-41) of a serving cell 1 is the period during when drx_period_2 (DRX1 is OFF period) of the serving cell 1' s DRX group and drx_period_4 (DRX2 is OFF period) of the serving cell 1 overlap.

drx_period_A and drx_period_B and drx_period_C and drx_period_D in the serving cell 2 are shown in 1d-51.

Since drx_period_1 and drx_period_2 are identical to dtx_period_1 and dtx_period_2 respectively, followings apply.

dtx_period_A of a serving cell 1 is the period during when drx_period_1 (DRX1 is ON period) of the serving cell 1's DRX group and dtx_period_3 (DTX2 is ON period) of the serving cell 1 overlap.

dtx_period_B of a serving cell 1 is the period during when drx_period_1 (DRX1 is ON period) of the serving cell 1's DRX group and dtx_period_4 (DTX2 is OFF period) of the serving cell 1 overlap.

dtx_period_C of a serving cell 1 is the period during when drx_period_2 (DRX1 is OFF period) of the serving cell 1's DRX group and dtx_period_3 (DTX2 is ON period) of the serving cell 1 overlap.

dtx_period_D of a serving cell 1 is the period during when drx_period_2 (DRX1 is OFFperiod) of the serving cell 1's DRX group and dtx_period_4 (DTX2 is OFF period) of the serving cell 1 overlap.

In drx_period_A of a serving cell, UE performs followings for the serving cell.

1: UE measures reference signals.

2-1: UE monitors PDCCH for downlink scheduling for DTCH/DCCH and uplink scheduling for DTCH/DCCH.

2-2: UE monitors PDCCH for sidelink scheduling 2-3: UE monitors PDCCH for MBS scheduling 2-4: UE monitors PDCCH for uplink power control 2-5: UE does not monitor PDCCH for DCP (DCI scrambled with Power Saving-RNTI)

2-6: UE monitors PDCCH for system information 2-7: UE monitors PDCCH for paging and Short Message 2-8: UE monitors PDCCH for random access procedure 3-1: UE receives PDSCH scheduled by PDCCH 3-2: UE receives PDSCH based on configured assignment (SPS assignment)

3-3: UE receives PDSCH scheduled for MBS 4-1: UE measures P-SSS and S-SSS and PSBCH 4-2: UE monitors PSCCH 4-3: UE receives PSSCH and PSFCH In drx_period_B of a serving cell, UE performs followings for the first serving cell.

1: UE measures a specific reference signal. The specific reference signal is determined based on drx2-signal-set field.

2-1: UE does not monitor PDCCH for downlink scheduling for DTCH/DCCH and uplink scheduling for DTCH/DCCH.

2-2: UE monitors PDCCH for sidelink scheduling 2-3: UE monitors PDCCH for MBS scheduling 2-4: UE does not monitor PDCCH for uplink power control 2-5: UE does not monitor PDCCH for DCP 2-6: UE does not monitor PDCCH for system information 2-7: UE does not monitor PDCCH for paging and Short Message 2-8: UE does not monitor PDCCH for random access procedure 3-1: UE does not receive PDSCH scheduled by PDCCH 3-2: UE does not receive PDSCH based on configured assignment (SPS assignment)

3-3: UE receives PDSCH scheduled for MBS 4-1: UE measures P-SSS and S-SSS and PSBCH 4-2: UE monitors PSCCH 4-3: UE receives PSSCH and PSFCH In drx_period_C of a serving cell, UE performs followings for the serving cell.

1: UE measures a specific reference signal. The specific reference signal is predefined. The specific reference signal includes PRS.

2-1: UE does not monitor PDCCH for downlink scheduling for DTCH/DCCH and uplink scheduling for DTCH/DCCH.

2-2: UE monitors PDCCH for sidelink scheduling 2-3: UE monitors PDCCH for MBS scheduling 2-4: UE does not monitor PDCCH for uplink power control 2-5: UE monitors PDCCH for DCP 2-6: UE does not monitor PDCCH for system information 2-7: UE does not monitor PDCCH for paging and Short Message 2-8: UE does not monitor PDCCH for random access procedure 3-1: UE does not receive PDSCH scheduled by PDCCH 3-2: UE receives PDSCH based on configured assignment (SPS assignment)

3-3: UE receives PDSCH scheduled for MBS 4-1: UE measures P-SSS and S-SSS and PSBCH 4-2: UE monitors PSCCH 4-3: UE receives PSSCH and PSFCH In drx_period_D of a serving cell, UE performs followings for the serving cell.

1: UE measures a specific reference signal. The specific reference signal is determined based on based on drx2-signal-set field.

2-1: UE does not monitor PDCCH for downlink scheduling for DTCH/DCCH and uplink scheduling for DTCH/DCCH.

2-2: UE monitors PDCCH for sidelink scheduling 2-3: UE monitors PDCCH for MBS scheduling 2-4: UE does not monitor PDCCH for uplink power control 2-5: UE does not monitor PDCCH for DCP 2-6: UE does not monitor PDCCH for system information 2-7: UE does not monitor PDCCH for paging and Short Message 2-8: UE does not monitor PDCCH for random access procedure 3-1: UE does not receive PDSCH scheduled by PDCCH 3-2: UE receives PDSCH based on configured assignment (SPS assignment)

3-3: UE receives PDSCH scheduled for MBS 4-1: UE measures P-SSS and S-SSS and PSBCH 4-2: UE monitors PSCCH 4-3: UE receives PSSCH and PSFCH In dtx_period_A of a serving cell, UE performs followings for the serving cell.

1-1: UE transmits periodic SRS and semi-persistent SRS.

1-2: UE transmits aperiodic SRS.

2-1: UE reports periodic CSI on PUCCH and semi-persistent CSI on PUSCH.

2-2: UE reports aperiodic CSI on PUSCH 3-1: UE transmits SR on PUCCH 3-2: UE transmits HARQ feedback on PUCCH for PDSCH carrying DTCH/DCCH 3-3: UE transmits HARQ feedback for PDSCH carrying MTCH 4-1: UE transmits PRACH preamble 5-1: UE transmits PUSCH scheduled by PDCCH 5-2: UE transmits PUSCH scheduled by configured grants.

6-1: UE transmits P-SSS and S-SSS and PSBCH 6-2: UE transmits PSCCH 6-3: UE transmits PSSCH and PSFCH In dtx_period_B of a serving cell, UE performs followings for the serving cell.

1-1: UE does not transmit periodic SRS and semi-persistent SRS.

1-2: UE transmits aperiodic SRS.

2-1: UE does not report periodic CSI on PUCCH and semi-persistent CSI on PUSCH.

2-2: UE reports aperiodic CSI on PUSCH 3-1: UE transmits SR on PUCCH 3-2: UE does not transmit HARQ feedback on PUCCH for PDSCH carrying DTCH/DCCH 3-3: UE does not transmit HARQ feedback for PDSCH carrying MTCH 4-1: UE does not transmit PRACH preamble 5-1: UE does not transmit PUSCH scheduled by PDCCH 5-2: UE does not transmit PUSCH scheduled by configured grants.

6-1: UE transmits P-SSS and S-SSS and PSBCH 6-2: UE transmits PSCCH 6-3: UE transmits PSSCH and PSFCH In dtx_period_C of a serving cell, UE performs followings for the serving cell.

1-1: UE does not transmit periodic SRS and semi-persistent SRS.

1-2: UE transmits aperiodic SRS.

2-1: UE does not report periodic CSI on PUCCH and semi-persistent CSI on PUSCH.

2-2: UE reports aperiodic CSI on PUSCH 3-1: UE transmits SR on PUCCH 3-2: UE transmits HARQ feedback on PUCCH for PDSCH carrying DTCH/DCCH 3-3: UE does not transmit HARQ feedback for PDSCH carrying MTCH 4-1: UE transmits PRACH preamble 5-1: UE does not transmit PUSCH scheduled by PDCCH 5-2: UE transmits PUSCH scheduled by configured grants.

6-1: UE transmits P-SSS and S-SSS and PSBCH 6-2: UE transmits PSCCH 6-3: UE transmits PSSCH and PSFCH In dtx_period_D of a serving cell, UE performs followings for the serving cell.

1-1: UE does not transmit periodic SRS and semi-persistent SRS.

1-2: UE transmits aperiodic SRS.

2-1: UE does not report periodic CSI on PUCCH and semi-persistent CSI on PUSCH.

2-2: UE reports aperiodic CSI on PUSCH 3-1: UE transmits SR on PUCCH 3-2: UE does not transmit HARQ feedback on PUCCH for PDSCH carrying DTCH/DCCH 3-3: UE does not transmit HARQ feedback for PDSCH carrying MTCH 4-1: UE does not transmit PRACH preamble 5-1: UE does not transmit PUSCH scheduled by PDCCH 5-2: UE does not transmit PUSCH scheduled by configured grants.

6-1: UE transmits P-SSS and S-SSS and PSBCH 6-2: UE transmits PSCCH 6-3: UE transmits PSSCH and PSFCH Table 10 lists behaviour of GNB and UE in DRX3 in first servin gcell which is activated.

TABLE 10

| Signal | drx_period_A ON + ON | | drx_period_B ON + OFF | | drx_period_C OFF + ON | | drx_period_D OFF + OFF | |
|---|---|---|---|---|---|---|---|---|
| | GNB | UE | GNB | UE | GNB | UE | GNB | UE |
| downlink_synch | tx | rx | cnfg | cnfg | tx | not rx | cnfg | not rx |
| downlink_csi_reference | tx | rx | cnfg | cnfg | tx | not rx | cnfg | not rx |
| downlink_demodulation_reference | tx | rx | cnfg | cnfg | tx | not rx | cnfg | not rx |
| downlink_phase_tracking_reference | tx | rx | cnfg | cnfg | tx | not rx | cnfg | not rx |
| downlink_positioning_reference | tx | rx | not tx | not rx | tx | rx | not tx | not rx |
| downlink_si_common_pdcch | tx | rx | not tx | not rx | tx | not rx | not tx | not rx |
| downlink_si_common_pdsch | tx | rx | not tx | not rx | tx | not rx | not tx | not rx |
| downlink_paging_common_pdcch | tx | rx | not tx | not rx | tx | not rx | not tx | not rx |
| downlink_paging_common_pdsch | tx | rx | not tx | not rx | tx | not rx | not tx | not rx |
| downlink_random_access_common_pdcch | tx | rx | not tx | not rx | tx | rx | not tx | not rx |
| downlink_random_access_common_pdsch | tx | rx | not tx | not rx | tx | rx | not tx | not rx |
| downlink_TPC_SRS_group_pdcch | tx | rx | not tx | not rx | tx | not rx | not tx | not rx |
| downlink_Cancel_UE_pdcch | tx | rx | not tx | not rx | tx | not rx | not tx | not rx |
| downlink_availability_UE_pdcch | tx | rx | not tx | not rx | tx | not rx | not tx | not rx |
| downlink_power_saving_group_pdcch | tx | not rx | not tx | not rx | tx | rx | not tx | not rx |
| downlink_pei_group_pdcch | tx | rx | not tx | not rx | tx | not rx | tx | not rx |
| downlink_NR_Sidelink_UE_pdcch_dynamic | tx | rx | cnfg | cnfg | tx | not rx | cnfg | cnfg |
| downlink_NR_Sidelink_UE_pdcch_configured | tx | rx | cnfg | cnfg | tx | not rx | cnfg | cnfg |
| downlink_LTE_Sidelink_UE_pdcch_configured | tx | rx | cnfg | cnfg | tx | not rx | cnfg | cnfg |
| downlink_broadcast_group_pdcch_dynamic | tx | rx | not tx | rx | tx | rx | not tx | rx |
| downlink_broadcast_group_pdsch | tx | rx | not tx | rx | tx | rx | not tx | rx |
| downlink_multicast_group_pdcch_configured | tx | rx | not tx | rx | tx | rx | not tx | rx |
| downlink_multicast_group_pdcch_dynamic | tx | rx | not tx | rx | tx | rx | not tx | rx |
| downlink_multicast_group_pdsch | tx | rx | not tx | rx | tx | rx | not tx | rx |
| downlink_PDSCH_UE_pdcch_dynamic | tx | rx | not tx | not rx | tx | not rx | not tx | not rx |
| downlink_PDSCH_UE_pdsch_dynamic | tx | rx | not tx | not rx | tx | not rx | not tx | not rx |
| downlink_PDSCH_UE_pdcch_configured | tx | rx | not tx | not rx | tx | not rx | not tx | not rx |
| downlink_PDSCH_UE_pdsch_configured | tx | rx | not tx | not rx | tx | rx | not tx | not rx |
| downlink_PUSCH_UE_pdcch_dynamic | tx | rx | not tx | not rx | tx | not rx | not tx | not rx |
| downlink_PUSCH_UE_pdcch_configured | tx | rx | not tx | not rx | tx | not rx | not tx | not rx |
| sidelink_pscch | N/A | rx | N/A | rx | N/A | rx | N/A | rx |
| sidelink_pssch | N/A | rx | N/A | rx | N/A | rx | N/A | rx |
| sidelink_psfch | N/A | rx | N/A | rx | N/A | rx | N/A | rx |
| sidelink_sync_reference | N/A | rx | N/A | rx | N/A | rx | N/A | rx |

The signals denoted with "tx" in GNB column of drx_period_A belong to drx_signal_set_gnb_A.

The signals denoted with "tx" in GNB column of drx_period_B belong to drx_signal_set_gnb_B.

The signals denoted with "cnfg" in GNB column of drx_period_B belong to drx_signal_set_gnb_B if the corresponding signal is configured to be transmitted during drx_period_4.

The signals denoted with "tx" in GNB column of drx_period_C belong to drx_signal_set_gnb_C.

The signals denoted with "tx" in GNB column of drx_period_D belong to drx_signal_set_gnb_D.

The signals denoted with "cnfg" in GNB column of drx_period_D belong to drx_signal_set_gnb_B if the corresponding signal is configured to be transmitted during drx_period_4.

The signals denoted with "rx" in UE column of drx_period_A belong to drx_signal_set_ue_A.

The signals denoted with "rx" in UE column of drx_period_B belong to drx_signal_set_ue_B.

The signals denoted with "cnfg" in UE column of drx_period_B belong to drx_signal_set_ue_B if the corresponding signal is configured to be received during drx_period_4.

The signals denoted with "rx" in UE column of drx_period_C belong to drx_signal_set_ue_C.

The signals denoted with "rx" in UE column of drx_period_D belong to drx_signal_set_ue_D.

The signals denoted with "cnfg" in UE column of drx_period_D belong to drx_signal_set_ue_B if the corresponding signal is configured to be received during drx_period_4.

Whether a signal denoted with "cnfg" is received by UE (and transmitted by the base station) during drx_period_4 is configured in DRX2Config2 of the concerned serving cell. Each signal denoted with "cfng" is associated with a IE enumerated with a single value of "configured". If the IE is present in the DRX2Config2, the corresponding signal is to be received by UE (and transmitted by the base station) during drx_period_4. If the IE is absent in the DRX2Config2, the corresponding signal is to be not received by UE (and not transmitted by the base station) during drx_period_4. For example, a IE is defined for downlink_synch and another IE is defined for downlink_csi_reference and so on.

Table 11 lists behaviour of GNB and UE in DRX3 in first servin gcell which is deactivated.

TABLE 11

| Signal | drx_period_A ON + ON | | drx_period_B ON + OFF | | drx_period_C OFF + ON | | drx_period_D OFF + OFF | |
|---|---|---|---|---|---|---|---|---|
| | GNB | UE | GNB | UE | GNB | UE | GNB | UE |
| downlink_synch | tx | rx | cnfg | not rx | tx | not rx | cnfg | not rx |
| downlink_csi_reference | tx | not rx | cnfg | not rx | tx | not rx | cnfg | not rx |
| downlink_demodulation_reference | tx | not rx | cnfg | not rx | tx | not rx | cnfg | not rx |
| downlink_phase_tracking_reference | tx | not rx | cnfg | not rx | tx | not rx | cnfg | not rx |
| downlink_positioning_reference | tx | rx | not tx | not rx | tx | rx | not tx | not rx |
| downlink_si_common_pdcch | tx | not rx | not tx | not rx | tx | not rx | not tx | not rx |
| downlink_si_common_pdsch | tx | not rx | not tx | not rx | tx | not rx | not tx | not rx |
| downlink_paging_common_pdcch | tx | not rx | not tx | not rx | tx | not rx | not tx | not rx |
| downlink_paging_common_pdsch | tx | not rx | not tx | not rx | tx | not rx | not tx | not rx |
| downlink_random_access_common_pdcch | tx | not rx | cnfg | not rx | tx | not rx | cnfg | not rx |
| downlink_random_access_common_pdsch | tx | not rx | cnfg | not rx | tx | not rx | cnfg | not rx |
| downlink_TPC_SRS_group_pdcch | tx | not rx | cnfg | not rx | tx | not rx | cnfg | not rx |
| downlink_Cancel_UE_pdcch | tx | not rx | cnfg | not rx | tx | not rx | cnfg | not rx |
| downlink_availability_UE_pdcch | tx | not rx | not tx | not rx | tx | not rx | not tx | not rx |
| downlink_power_saving_group_pdcch | tx | not rx | not tx | not rx | tx | not rx | not tx | not rx |
| downlink_pei_group_pdcch | tx | not rx | not tx | not rx | tx | not rx | not tx | not rx |
| downlink_NR_Sidelink_UE_pdcch_dynamic | tx | not rx | cnfg | not rx | tx | not rx | cnfg | not rx |
| downlink_NR_Sidelink_UE_pdcch_configured | tx | not rx | cnfg | not rx | tx | not rx | cnfg | not rx |
| downlink_LTE_Sidelink_UE_pdcch_configured | tx | not rx | cnfg | not rx | tx | not rx | cnfg | not rx |
| downlink_broadcast_group_pdcch_dynamic | tx | not rx | not tx | not rx | tx | not rx | not tx | not rx |
| downlink_broadcast_group_pdsch | tx | not rx | not tx | not rx | tx | not rx | not tx | not rx |
| downlink_multicast_group_pdcch_configured | tx | not rx | not tx | not rx | tx | not rx | not tx | not rx |

TABLE 11-continued

| Signal | drx_period_A ON + ON | | drx_period_B ON + OFF | | drx_period_C OFF + ON | | drx_period_D OFF + OFF | |
|---|---|---|---|---|---|---|---|---|
| | GNB | UE | GNB | UE | GNB | UE | GNB | UE |
| downlink_multicast_group_pdcch_dynamic | tx | not rx | not tx | not rx | tx | not rx | not tx | not rx |
| downlink_multicast_group_pdsch | tx | not rx | not tx | not rx | tx | not rx | not tx | not rx |
| downlink_PDSCH_UE_pdcch_dynamic | tx | not rx | not tx | not rx | tx | not rx | not tx | not rx |
| downlink_PDSCH_UE_pdsch_dynamic | tx | not rx | not tx | not rx | tx | not rx | not tx | not rx |
| downlink_PDSCH_UE_pdcch_configured | tx | not rx | not tx | not rx | tx | not rx | not tx | not rx |
| downlink_PDSCH_UE_pdsch_configured | tx | not rx | not tx | not rx | tx | not rx | not tx | not rx |
| downlink_PUSCH_UE_pdcch_dynamic | tx | not rx | not tx | not rx | tx | not rx | not tx | not rx |
| downlink_PUSCH_UE_pdcch_configured | tx | not rx | not tx | not rx | tx | not rx | not tx | not rx |
| sidelink_pscch | N/A | rx | N/A | rx | N/A | rx | N/A | rx |
| sidelink_pssch | N/A | rx | N/A | rx | N/A | rx | N/A | rx |
| sidelink_psfch | N/A | rx | N/A | rx | N/A | rx | N/A | rx |
| sidelink_sync_reference | N/A | rx | N/A | rx | N/A | rx | N/A | rx |

Table 12 lists behaviour of GNB and UE in DTX3 in a first serving cell which is activated.

The signals denoted with "tx" in UE column of dtx_period_A belong to dtx_signal_set_ue_A.

TABLE 12

| Signal | dtx_period_A | | dtx_period_B | | dtx_period_C | | dtx_period_D | |
|---|---|---|---|---|---|---|---|---|
| | GNB | UE | GNB | UE | GNB | UE | GNB | UE |
| uplink_sounding_reference_periodic | rx | tx | not rx | not tx | rx | not tx | not rx | not tx |
| uplink_sounding_reference_semi_persistent | rx | tx | not rx | not tx | rx | not tx | not rx | not tx |
| uplink_sounding_reference_aperiodic | rx | tx | rx | tx | rx | tx | rx | tx |
| uplink_csi_reporting_pucch_periodic | rx | tx | not rx | not tx | rx | not tx | not rx | not tx |
| uplink_csi_reporting_pusch_semi_persistent | rx | tx | not rx | not tx | rx | not tx | not rx | not tx |
| uplink_csi_reporting_pusch_aperiodic | rx | tx | rx | tx | rx | tx | rx | tx |
| uplink_harq_feedback_pucch | rx | tx | rx | not tx | rx | tx | rx | not tx |
| uplink_sr_pucch | rx | tx | rx | not tx | rx | tx | rx | not tx |
| uplink_prach | rx | tx | rx | not tx | rx | tx | rx | not tx |
| uplink_pusch_dynamic | rx | tx | not rx | not tx | rx | not tx | not rx | not tx |
| uplink_pusch_configured | rx | tx | not rx | not tx | rx | not tx | not rx | not tx |
| sidelink_pscch | N/A | tx | N/A | tx | N/A | tx | N/A | tx |
| sidelink_pssch | N/A | tx | N/A | tx | N/A | tx | N/A | tx |
| sidelink_psfch | N/A | tx | N/A | tx | N/A | tx | N/A | tx |
| sidelink_sync_reference | N/A | tx | N/A | tx | N/A | tx | N/A | tx |

The signals denoted with "rx" in GNB column of dtx_period_A belong to dtx_signal_sct_gnb_A.

The signals denoted with "rx" in GNB column of dtx_period_B belong to dtx_signal_sct_gnb_B.

The signals denoted with "rx" in GNB column of dtx_period_C belong to dtx_signal_set_gnb_C.

The signals denoted with "rx" in GNB column of dtx_period_D belong to dtx_signal_set_gnb_D.

The signals denoted with "tx" in UE column of dtx_period_B belong to dtx_signal_set_ue_B.

The signals denoted with "tx" in UE column of dtx_period_C belong to dtx_signal_set_ue_C.

The signals denoted with "tx" in UE column of dtx_period_D belong to dtx_signal_set_ue_D.

Table 13 lists behaviour of GNB and UE in DTX3 in a first serving cell which is deactivated.

TABLE 13

| Signal | dtx_period_A | | dtx_period_B | | dtx_period_C | | dtx_period_D | |
|---|---|---|---|---|---|---|---|---|
| | GNB | UE | GNB | UE | GNB | UE | GNB | UE |
| uplink_sounding_reference_periodic | rx | tx | not rx | not tx | rx | not tx | not rx | not tx |
| uplink_sounding_reference_semi_persistent | rx | tx | not rx | not tx | rx | not tx | not rx | not tx |
| uplink_sounding_reference_aperiodic | rx | tx | rx | tx | rx | tx | rx | tx |
| uplink_csi_reporting_pucch_periodic | rx | tx | not rx | not tx | rx | not tx | not rx | not tx |
| uplink_csi_reporting_pusch_semi_persistent | rx | tx | not rx | not tx | rx | not tx | not rx | not tx |
| uplink_csi_reporting_pusch_aperiodic | rx | tx | rx | tx | rx | tx | rx | tx |
| uplink_harq_feedback_pucch | rx | tx | rx | not tx | rx | tx | rx | not tx |
| uplink_sr_pucch | rx | tx | rx | not tx | rx | tx | rx | not tx |
| uplink_prach | rx | tx | rx | not tx | rx | tx | rx | not tx |
| uplink_pusch_dynamic | rx | tx | not rx | not tx | rx | not tx | not rx | not tx |
| uplink_pusch_configured | rx | tx | not rx | not tx | rx | not tx | not rx | not tx |
| sidelink_pscch | N/A | tx | N/A | tx | N/A | tx | N/A | tx |
| sidelink_pssch | N/A | tx | N/A | tx | N/A | tx | N/A | tx |
| sidelink_psfch | N/A | tx | N/A | tx | N/A | tx | N/A | tx |
| sidelink_sync_reference | N/A | tx | N/A | tx | N/A | tx | N/A | tx |

In DRX1 operation, UE does not continuously monitor PDCCH.

When DRX1 is configured for a UE, followings apply.

1: drx_period_1 and drx_period_2 occurs periodically.

2: GNB performs transmission of drx_signal_set_gnb_1 during drx_period_1. GNB performs transmission of drx_signal_set_gnb_2 during drx_period_2.

3: UE performs reception of drx_signal_set_ue_1 during drx_period_1. UE performs reception of drx_signal_set_ue_2 during drx_period_2.

In DTX1 operation, UE selectively transmits uplink signals and GNB selectively receives uplink signals.

DTX1 operation applies when DRX1 is configured.

When DRX1 is configured for a UE, followings apply.

1: dtx_period_1 and dtx_period_2 occurs periodically. dtx_period_1 and drx_period_1 start and end at the same time. dtx_period_2 and drx_period_2 start and end at the same time.

2: GNB performs reception of dtx_signal_set_gnb_1 during dtx_period_1. GNB performs reception of dtx_signal_set_gnb_2 during dtx_period_2.

3: UE performs transmission of dtx_signal_set_ue_1 during dtx_period_1. UE performs transmission of dtx_signal_set_ue_2 during dtx_period_2.

In DRX2 operation, GNB does not continuously transmit downlink signals and UE does not continuously receive downlink signals.

When DRX2 is activated for a cell, followings apply.

1: drx_period_3 and drx_period_4 occurs periodically.

2: GNB performs transmission of drx_signal_set_gnb_3 in the cell during drx_period_3. GNB performs transmission of drx_signal_set_gnb_4 in the cell during drx_period_4.

3: UE in the cell performs reception of drx_signal_set_ue_3 during drx_period_3. UE performs reception of drx_signal_set_ue_4 during drx_period_4.

In DTX2 operation, GNB does not continuously receive uplink signals and UE does not continuously transmit uplink signals.

When DTX2 is activated for a cell, followings apply.

1: dtx_period_3 and dtx_period_4 occurs periodically. dtx_period_3 and drx_period_3 start and end at the different time. dtx_period_4 and drx_period_4 start and end at the different time.

2: GNB performs reception of dtx_signal_set_gnb_3 during dtx_period_3. GNB performs reception of dtx_signal_set_gnb_4 during dtx_period_4.

3: UE performs transmission of dtx_signal_set_ue_3 during dtx_period_3. UE performs transmission of dtx_signal_set_ue_4 during dtx_period_4.

If SUL is configured in the serving cell, dtx_period_3 of NUL and dtx_period_3 of SUL occurs independently.

If SUL is configured in the serving cell, dtx_period_4 of NUL and dtx_period_4 of SUL occurs independently.

In DRX3 operation, GNB does not continuously transmit downlink signals and UE does not continuously receive downlink signals.

When DRX3 is applied for a downlink of a cell, followings apply.

1: drx_period_A and drx_period_B and drx_period_C and drx_period_D occurs. The order of occurrence of drx_period_A and drx_period_B and drx_period_C and drx_period_D is not fixed and determined by drx_period_1 and drx_period_2 and drx_period_3 and drx_period_4.

2: GNB performs transmission of drx_signal_set_gnb_a in the downlink of the cell during drx_period_A. GNB performs transmission of drx_signal_set_gnb_b in the downlink of the cell during drx_period_B. GNB performs transmission of drx_signal_set_gnb_c in the downlink of the cell during drx_period_C. GNB performs transmission of drx_signal_set_gnb_d in the downlink of the cell during drx_period_D.

3: UE performs reception of drx_signal_set_ue_a in the downlink of the cell during drx_period_A. UE performs reception of drx_signal_set_ue_b in the downlink of the cell during drx_period_B. UE performs reception of drx_signal_set_ue_c in the downlink of the cell during drx_period_C. UE performs reception of drx_signal_set_ue_d in the downlink of the cell during drx_period_D.

In DTX3 operation, GNB does not continuously receive uplink signals and UE does not continuously transmit uplink signals.

When DTX3 is applied to an uplink of a cell, followings apply.

1: dtx_period_A and dtx_period_B and dtx_period_C and dtx_period_D occurs. The order of occurrence of dtx_period_A and dtx_period_B and dtx_period_C and dtx_period_D is determined by drx_period_1 and drx_period_2 and dtx_period_3 and dtx_period_4.

2: GNB performs reception of dtx_signal_set_gnb_a in the uplink of the cell during dtx_period_A. GNB performs reception of dtx_signal_set_gnb_b in the uplink of the cell during dtx_period_B. GNB performs reception of dtx_signal_set_gnb_c in the uplink of the cell during dtx_period_C. GNB performs reception of dtx_signal_set_gnb_d in the uplink of the cell during dtx_period_D.

3: UE performs reception of dtx_signal_set_ue_a in the uplink of the cell during dtx_period_A. UE performs reception of dtx_signal_set_ue_b in the uplink of the cell during dtx_period_B. UE performs reception of dtx_signal_set_ue_c in the uplink of the cell during dtx_period_C. UE performs reception of dtx_signal_set_ue_d in the uplink of the cell during dtx_period_D.

Figure 2A:
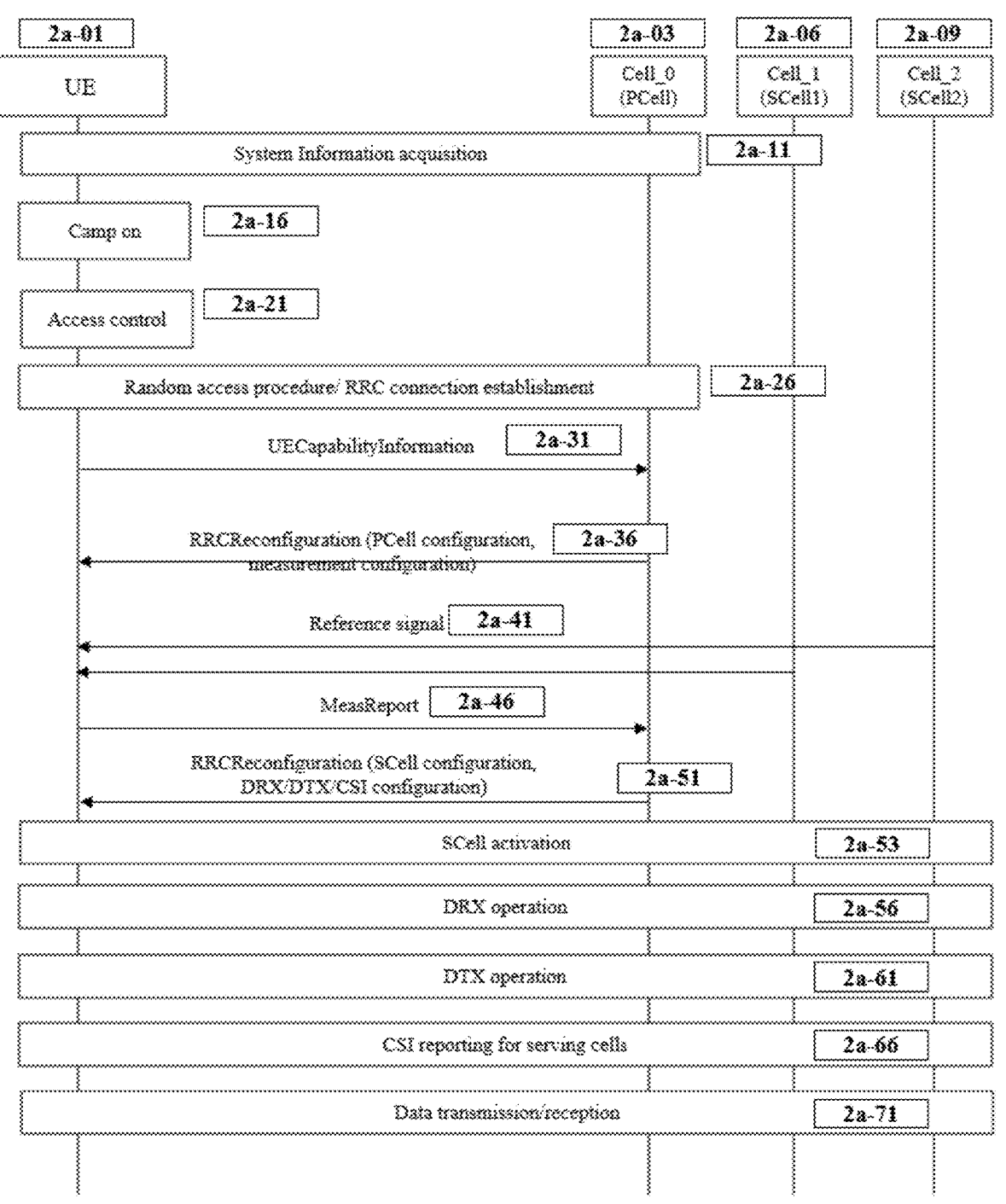
FIG. 2a is a diagram illustrating operations of a terminal and a base station according to an embodiment of the present invention.

FIG. 2a illustrates the operations of UE and base station.

In 2a-11, UE acquires system information form the cell_0.

UE receives a MIB and a SIB1 and one or more SIs. A SI may contain one or more SIBs. A specific SIB may contain DRX2 configuration and DTX2 configuration of the cell. DRX2 configuration includes a DRX2Config1 and one or more DRX2Config2. DTX2 configuration includes one or more DTX2Config.

In 2a-16, UE camps on the cell_0.

UE monitors paging channel in the cell_0. At some point of time, UE initiates RRC connection establishment procedure for various purposes. For example, UE initiates RRC connection establishment procedure when user starts web browsing.

In 2a-21, UE performs access control based on the acquires system information.

In 2a-26, UE performs random access procedure and RRC connection establishment.

UE applies DTX2 operation for preamble transmission if DTX2 configuration is provided in the specific SIB. UE determines which PRACH occasion is valid based on the DTX2 configuration. UE transmits preamble in PRACH occasion in dtx_period_3 determined based on system information. UE does not apply DTX2 operation for Msg3 transmission and HARQ feedback transmission (for Msg 4). UE transmits Msg3 and HARQ feedback for Msg 4 either in dtx_period_3 or in dtx_period_4 determined based on the system information.

UE transmits RRCSetupRequest in Msg 3. UE receives RRCSetup in Msg4.

UE and GNB establishes SRB1 and SRB2 via RRC connection establishment procedure.

Before DRX2 configuration is received via RRC message, UE applies DRX2 and DTX2 operation based on DRX2 configuration and DTX2 configuration in system information.

In 2a-31, UE transmits UECapabilityInformation to the GNB via cell_0.

UECapabilityInformation may include following information.

1: first information indicating whether the UE supports DRX2 operation in NR. If this information is absent, UE supports none of following functional components. If this information is present, UE supports all of following functional components:

activating and deactivating a DRX2 configuration based on DRX2_DTX2_COMMAND;

activating and deactivating a DRX2 configuration based on RRC message; and monitoring D-RNTI in the searchSpace configured for DRX2_DTX2_COMMAND 2: second information indicating whether the UE supports DTX2 operation in NR. If this information is absent, UE supports none of following functional components. If this information is present, UE supports all of following functional components.

activating and deactivating DTX2 operation based on DRX2_DTX2_COMMAND; and activating and deactivating a DTX2 configuration based on RRC message 3: third information indicating whether the UE supports DRX3/DTX3 operation (i.e. whether the UE support DRX operation based on configured DRX1 and active DRX2 and DTX operation based on configured DTX1 and active DTX2). If this information absent, UE does not support DRX3/DTX3. If this information and the first one bit information are present and if the second one bit information is absent, UE supports only DRX3 operation and does not support DTX3 operation. If this information and the first one bit information and the second one bit information are present, UE supports both DRX3 operation and DTX3 operation.

In 2a-36, UE receives RRCReconfiguration.

RRCReconfiguration contains various configuration information for the UE. GNB determines the configuration information based on various fields concerning UE capability in the UECapability Information.

RRCReconfiguration includes DRB configuration information and PCell configuration information and measurement configuration information. Measurement configuration information includes information related to the reference signal to be measured.

In 2a-41, UE measures reference signal from cell_1 and cell_2.

UE measures SSB or CSI-RS depending on the measurement configuration.

In 2a-46, UE transmits MeasReport to the GNB via cell_0.

MeasReport includes the measurement results on the measured reference signal. GNB determines which neighbor cell is suitable for SCell of the UE.

In 2a-51, UE receives RRCReconfiguration from the GNB via cell_0.

The RRCReconfiguration includes configuration information for SCell and configuration information for DRX1. Configuration information for SCell may include DRX2 configuration information and DTX2 configuration information.

UE configures DRX1 and SCells and DRX2 and DTX2 according to the received configuration information.

In 2a-53, UE performs SCell activation operation for serving cells.

UE activates one or more SCells based on a SCell activation/deactivation MAC CE.

UE performs followings for activated SCells.

UE monitors PDCCH for the SCell based on DRX1 or DRX2 or DRX3 operation.

UE monitors PDCCH on the SCell based on DRX1 or DRX2 or DRX3 operation.

UE reports CSI for the SCell based on DTX1 or DTX2 or DTX3 operation.

UE transmits PUCCH on the SCell based on DTX1 or DTX2 or DTX3 operation.

UE transmits SRS on the SCell based on DTX2 or DTX3 operation.

UE runs (starts or stops) drx2-onDurationTimer based on DRX2 configuration.

UE runs (starts or stops) dtx2-onDurationTimer based on DTX2 configuration.

UE performs followings for deactivated SCells.

UE does not monitor PDCCH for the SCell.

UE does not monitor PDCCH on the SCell.

UE does not report CSI for the SCell.

UE does not transmit PUCCH on the SCell.

UE does not transmit SRS on the SCell.

UE measures SSB of the SCell periodically

Upon deactivating a SCell UE stops drx2-onDuration-Timer and dtx2-onDuration Timer.

Alternatively, UE keeps running drx2-onDurationTimer and dtx2-onDurationTimer for the deactivated SCell.

In 2*a*-56, UE performs DRX operation with activated serving cells.

In 2*a*-61, UE performs DTX operation with activated serving cells.

In 2*a*-66, UE performs CSI reporting for activated serving cells.

In 2*a*-71, UE performs data transfer with activated serving cells.

Figure 2B:
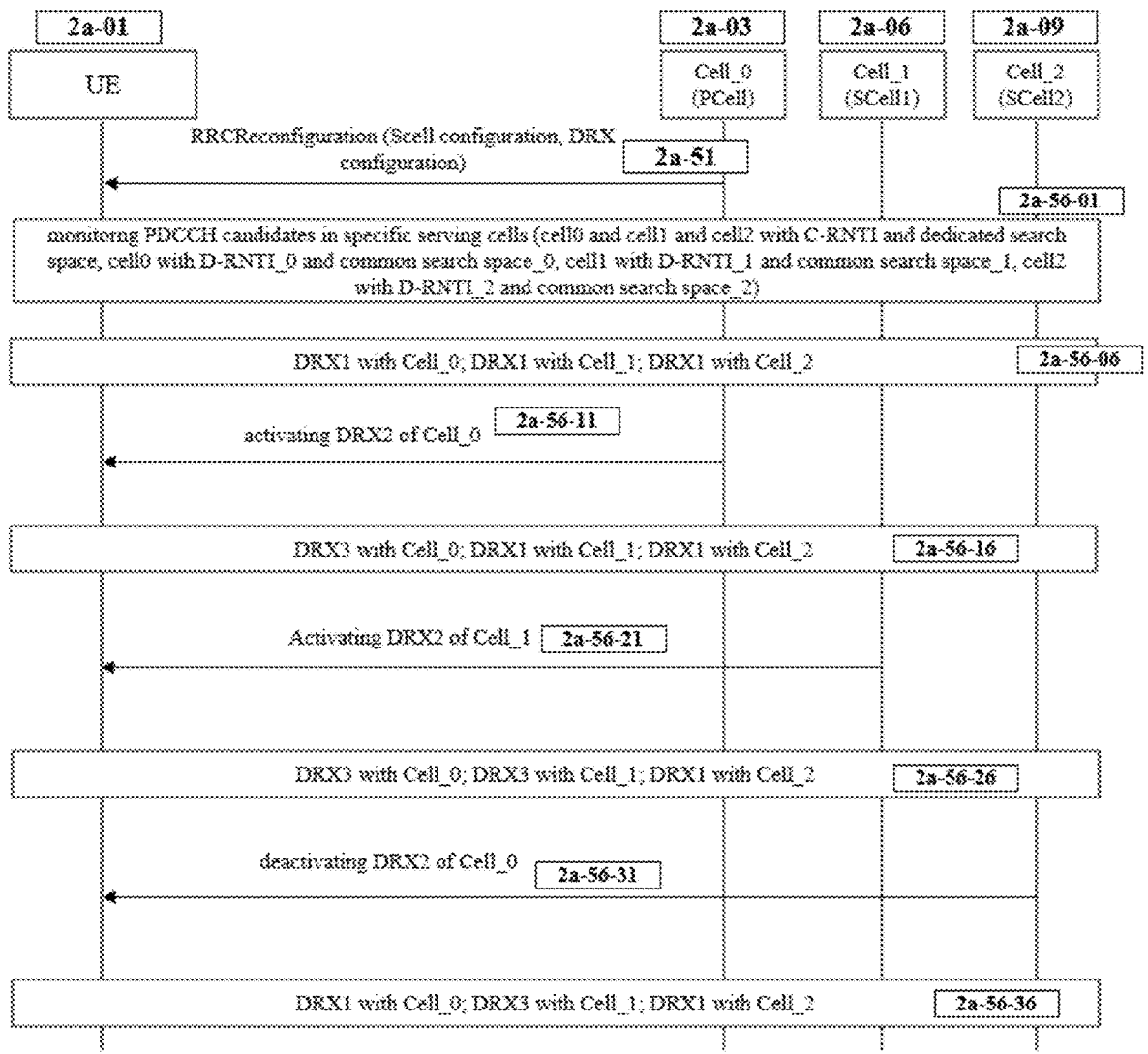
FIG. 2b is a diagram illustrating DRX operations of a terminal and a base station according to an embodiment of the present invention.

FIG. 2*b* illustrates the DRX operations of UE and base station.

In 2*a*-51, UE receives a RRCReconfiguration from the GNB via cell_0.

The RRCReconfiguration includes a DRX1 configuration for primary DRX group (DRX-Config IE) and a DRX1 configuration for secondary DRX group (DRX-ConfigSecondaryGroup IE) and a DRX2 configuration for cell_0 (DRX2-Config IE in ServingCellConfig of cell_0) and a DRX2 configuration for cell_1 (DRX2-Config IE in ServingCellConfig of cell_1).

Cell_0 belongs to the primary DRX group. Cell_1 and Cell_2 belong to the secondary DRX group.

In 2*a*-56-01, UE performs PDCCH monitoring for DRX2_DTX2_COMMAND reception and for data transfer.

UE monitors PDCCH candidates in one or more search spaces sets on SpCell and active serving cells.

UE monitors PDCCH candidates in CSS set configured by searchSpaceDRX2 in PDCCH-ConfigCommon of Serving-CellConfig of the first specific serving cell. UE monitors such PDCCH candidates with D-RNTI. The PDCCH candidates in CSS set configured by searchSpaceDRX2 is applied only to a first specific MAC CE (DRX2_DTX2_COMMAND) reception.

UE monitors PDCCH candidates in USS set configured by SearchSpace in PDCCH-Config with searchSpaceType=ue-Specific on active serving cells. UE monitors such PDCCH candidates with C-RNTI and CS-RNTI. UE monitors such PDCCH candidates for a second specific MAC CE (DRX1_DTX1_COMMAND) and various other MAC CEs (such as SCell Activation/Deactivation MAC CE). The PDCCH candidates in USS set configured by SearchSpace in PDCCH-Config with searchSpaceType=ue-Specific is applied to reception of second specific MAC CE (DRX1_DTX1_COMMAND) and various other MAC CEs (such as SCell Activation/Deactivation MAC CE).

DRX2_DTX2_COMMAND controls DRX2 operation and/or DTX2 operation of a specific serving cell by activating and/or deactivating DRX2 and/or DTX2 operation of the specific serving cell. The specific serving cell is the serving cell configured with DRX2 and/or DTX2. DRX2_DTX2_COMMAND has a variable size. DRX2_DTX2_COMMAND is identified by a MAC subheader with an eLCID. The specific serving cell is determined based on a specific field in the received DRX2_DTX2_COMMAND.

DRX1_DTX1_COMMAND controls DRX1 operation and DTX1 operation of currently active serving cells of a specific DRX group by stopping drx-onDurationTimer and drx-InactivityTimer. DRX1_DTX1_COMMAND has a fixed size of zero bits. DRX1_DTX1_COMMAND is identified by a MAC subheader with a LCID. The specific DRX group is the DRX group of the serving cell where DRX1_DTX1_COMMAND is received.

In 2*a*-56-06, UE performs DRX1 operation with the active serving cells.

For serving cells of the primary DRX group (cell_0), UE performs DRX1 operation based on drx-onDuration Timer, drx-InactivityTimer, drx-SlotOffset, drx-RetransmissionTimerDL, drx-RetransmissionTimerUL, drx-LongCycle-StartOffset, drx-ShortCycle, drx-ShortCycleTimer, drx-HARQ-RTT-TimerDL and drx-HARQ-RTT-TimerUL in the DRX-Config IE.

For serving cells of the secondary DRX group (cell_1 and cell_2), UE performs DRX1 operation based on first DRX parameters in the DRX-ConfigSecondaryGroup IE and second DRX parameters in DRX-Config IE.

The first DRX parameters are drx-onDurationTimer and drx-InactivityTime. The second DRX parameters are drx-SlotOffset, drx-Retransmission TimerDL, drx-Retransmission TimerUL, drx-LongCycleStartOffset, drx-ShortCycle, drx-ShortCycleTimer, drx-HARQ-RTT-TimerDL and drx-HARQ-RTT-TimerUL.

UE monitors PDCCH of serving cells during Active Time (drx_period_1). UE does not monitor PDCCH of serving cells during non-Active Time (drx_period_2).

In 2*a*-56-11, UE receives from the base station DRX2_DTX2_COMMAND activating DRX2 of cell_0.

A/D_DRX2 field is set to 1 and Serving_Cell_DRX2 field is set to the value corresponding to cell_0.

In 2*a*-56-16, UE performs DRX1 operation with the cell_1 and cell_2. UE performs DRX3 operation with cell_0 based on DRX1 configuration of the primary DRX group and a DRX2 configuration of cell_0.

The DRX2 configuration of cell_0 is determined based on DRX2Cofig1 of cell_0 and DRX2Cofnig2 of cell_0 indicated by DRX2_ID field in the received DRX2_DTX2_COMMAND.

In 2*a*-56-21, UE receives from the base station DRX2_DTX2_COMMAND activating DRX2 of cell_1.

A/D_DRX2 field is set to 1 and Serving_Cell_DRX2 field is set to the value corresponding to cell_1.

In 2*a*-56-26, UE performs DRX1 operation with the cell_2. UE performs DRX3 operation with cell_0 based on DRX1 configuration of the primary DRX group and DRX2 configuration of cell_0. UE performs DRX3 operation with cell_1 based on DRX1 configuration of the secondary DRX group and DRX2 configuration of cell_1.

The DRX2 configuration of cell_0 is determined based on DRX2Cofig1 of cell_0 and DRX2Cofnig2 of cell_0 indicated by DRX2_ID field in the received DRX2_DTX2_COMMAND.

In 2a-56-31, UE receives from the base station DRX2_DTX2_COMMAND for deactivating DRX2 of cell_0

A/D_DRX2 field is set to 0 and Serving_Cell_DRX2 field is set to the value corresponding to cell_1.

In 2a-56-36, UE performs DRX1 operation with the cell_0 and the cell_2. UE performs DRX3 operation with cell_1 based on DRX1 configuration of the secondary DRX group and DRX2 configuration of cell_1.

The DRX2 configuration of cell_1 is determined based on DRX2Cofig1 of cell_1 and DRX2Cofnig2 of cell_1 indicated by DRX2_ID field in the received DRX2_DTX2_COMMAND.

Figure 2C:
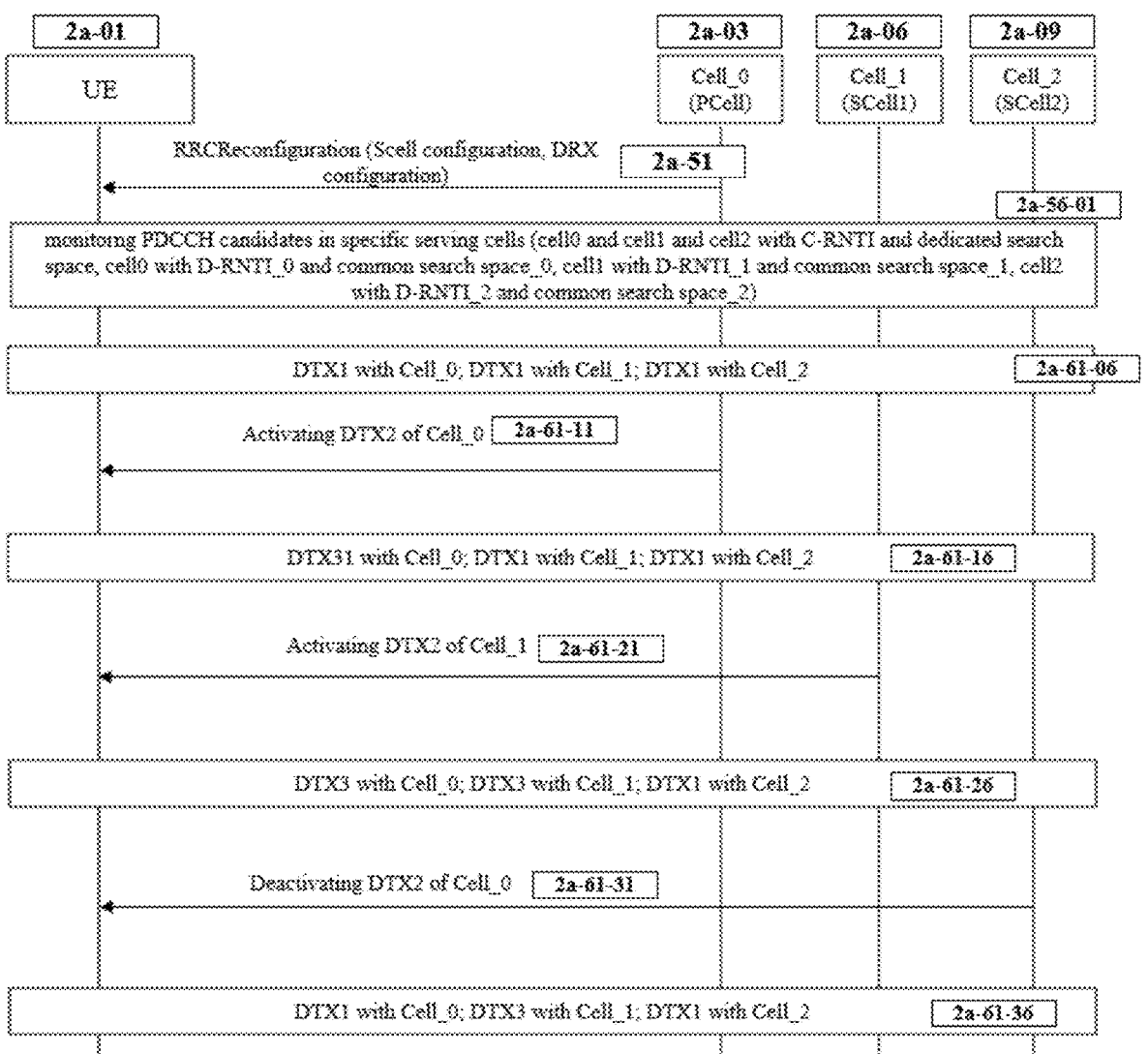
FIG. 2c is a diagram illustrating DTX operations of a terminal and a base station according to an embodiment of the present invention.

FIG. 2c illustrates the DTX operations between UE and cells.

In 2a-51, UE receives a RRCReconfiguration from the GNB via cell_0.

The RRCReconfiguration includes a DTX1 configuration for primary DRX group (DRX-Config IE) and a DTX1 configuration for secondary DRX group (DRX-ConfigSecondaryGroup IE) and a DTX2 configuration for cell_0 (DTX2-Config IE in ServingCellConfig of cell_0) and a DTX2 configuration for cell_1 (DTX2-Config IE in ServingCellConfig of cell_1).

In 2a-56-01, UE performs PDCCH monitoring for DRX2_DTX2_COMMAND reception and for data transfer.

In 2a-61-06, UE performs DTX1 operation with the active serving cells.

For serving cells of the primary DRX group (cell_0), UE performs DTX1 operation based on DRX-onDurationTimer, DRX-InactivityTimer, DRX-SlotOffset, DRX-RetransmissionTimerDL, DRX-RetransmissionTimerUL, DRX-LongCycleStartOffset, DRX-ShortCycle, DRX-ShortCycleTimer, DRX-HARQ-RTT-TimerDL and DRX-HARQ-RTT-TimerUL in the DRX-Config IE.

For serving cells of the secondary DRX group (cell_1 and cell_2), UE performs DTX1 operation based on first DRX parameters in the DRX-ConfigSecondaryGroup IE and second DRX parameters in DRX-Config IE.

The first DRX parameters are DRX-onDurationTimer and DRX-Inactivity Time. The second DRX parameters are DRX-SlotOffset, DRX-RetransmissionTimerDL, DRX-Retransmission TimerUL, DRX-LongCycleStartOffset, DRX-ShortCycle, DRX-ShortCycleTimer, DRX-HARQ-RTT-TimerDL and DRX-HARQ-RTT-TimerUL.

UE performs uplink transmission in serving cells during Active Time (DTX_period_1). UE does not perform uplink transmission in serving cells during non-Active Time (DTX_period_2).

In 2a-61-11, UE receives from the base station DRX2_DTX2_COMMAND activating DTX2 of cell_0.

A/D_DTX2 field is set to 1 and Serving_Cell_DTX2 field is set to the value corresponding to cell_0.

In 2a-61-16, UE performs DTX1 operation for NUL and SUL with the cell_1 and cell_2. UE performs DTX3 operation for one or two uplinks with cell_0 based on DTX1 configuration of the primary DRX group and DTX2 configuration of cell_0.

The DTX2 configuration of cell_0 is determined based on DTX2Cofig of cell_0 indicated by DRX2_ID field in the received DRX2_DTX2_COMMAND.

The one or two uplinks are determined based on SUL_indicator field.

In 2a-61-21, UE receives from the base station DRX2_DTX2_COMMAND activating DTX2 of cell_1.

A/D_DTX2 field is set to 1 and Serving_Cell_DTX2 field is set to the value corresponding to cell_1.

In 2a-61-26, UE performs DTX1 operation with the cell_2. UE performs DTX3 operation with cell_0 based on DTX1 configuration of the primary DRX group and DTX2 configuration of cell_0. UE performs DTX3 operation with cell_1 based on DTX1 configuration of the secondary DRX group and DTX2 configuration of cell_1.

In 2a-61-31, UE receives from the base station DRX2_DTX2_COMMAND for deactivating DTX2 of cell_0

A/D_DTX2 field is set to 0 and Serving_Cell_DTX2 field is set to the value corresponding to cell_1.

In 2a-61-36. UE performs DTX1 operation with the cell_0 and the cell_2. UE performs DTX3 operation with cell_1 based on DTX1 configuration of the secondary DRX group and DTX2 configuration of cell_1.

The table 14 below lists the abbreviations used in the present disclosure.

TABLE 14

| Acronym | Full name | Acronym | Full name |
|---|---|---|---|
| 5GC | 5G Core Network | RACH | Random Access Channel |
| ACK | Acknowledgement | RAN | Radio Access Network |
| AM | Acknowledged Mode | RAR | Random Access Response |
| AMF | Access and Mobility Management Function | RA-RNTI | Random Access RNTI |
| ARQ | Automatic Repeat Request | RAT | Radio Access Technology |
| AS | Access Stratum | RB | Radio Bearer |
| ASN.1 | Abstract Syntax Notation One | RLC | Radio Link Control |
| BSR | Buffer Status Report | RNA | RAN-based Notification Area |
| BWP | Bandwidth Part | RNAU | RAN-based Notification Area Update |
| CA | Carrier Aggregation | RNTI | Radio Network Temporary Identifier |
| CAG | Closed Access Group | RRC | Radio Resource Control |
| CG | Cell Group | RRM | Radio Resource Management |
| C-RNTI | Cell RNTI | RSRP | Reference Signal Received Power |
| CSI | Channel State Information | RSRQ | Reference Signal Received Quality |
| DCI | Downlink Control Information | RSSI | Received Signal Strength Indicator |

TABLE 14-continued

| Acronym | Full name | Acronym | Full name |
|---------|-----------|---------|-----------|
| DRB | (user) Data Radio Bearer | SCell | Secondary Cell |
| DRX | Discontinuous Reception | SCS | Subcarrier Spacing |
| HARQ | Hybrid Automatic Repeat Request | SDAP | Service Data Adaptation Protocol |
| IE | Information element | SDU | Service Data Unit |
| LCG | Logical Channel Group | SFN | System Frame Number |
| MAC | Medium Access Control | S-GW | Serving Gateway |
| MIB | Master Information Block | SI | System Information |
| NAS | Non-Access Stratum | SIB | System Information Block |
| NG-RAN | NG Radio Access Network | SpCell | Special Cell |
| NR | NR Radio Access | SRB | Signalling Radio Bearer |
| PBR | Prioritised Bit Rate | SRS | Sounding Reference Signal |
| PCell | Primary Cell | SS | Search Space |
| PCI | Physical Cell Identifier | SSB | SS/PBCH block |
| PDCCH | Physical Downlink Control Channel | SSS | Secondary Synchronisation Signal |
| PDCP | Packet Data Convergence Protocol | SUL | Supplementary Uplink |
| PDSCH | Physical Downlink Shared Channel | TM | Transparent Mode |
| PDU | Protocol Data Unit | UCI | Uplink Control Information |
| PHR | Power Headroom Report | UE | User Equipment |
| PLMN | Public Land Mobile Network | UM | Unacknowledged Mode |
| PRACH | Physical Random Access Channel | CRP | Cell Reselection Priority |
| PRB | Physical Resource Block | DCP | DCI scrambled with PS-RNTI |
| PSS | Primary Synchronisation Signal | DTX | Discontinuous Transmission |
| PUCCH | Physical Uplink Control Channel | DL-PRS | Downlink-Positioning Reference Signal |
| PUSCH | Physical Uplink Shared Channel | SL | Sidelink |
| D-RNTI | DRX-RNTI | TB | Transport Block |

Figure 3A:
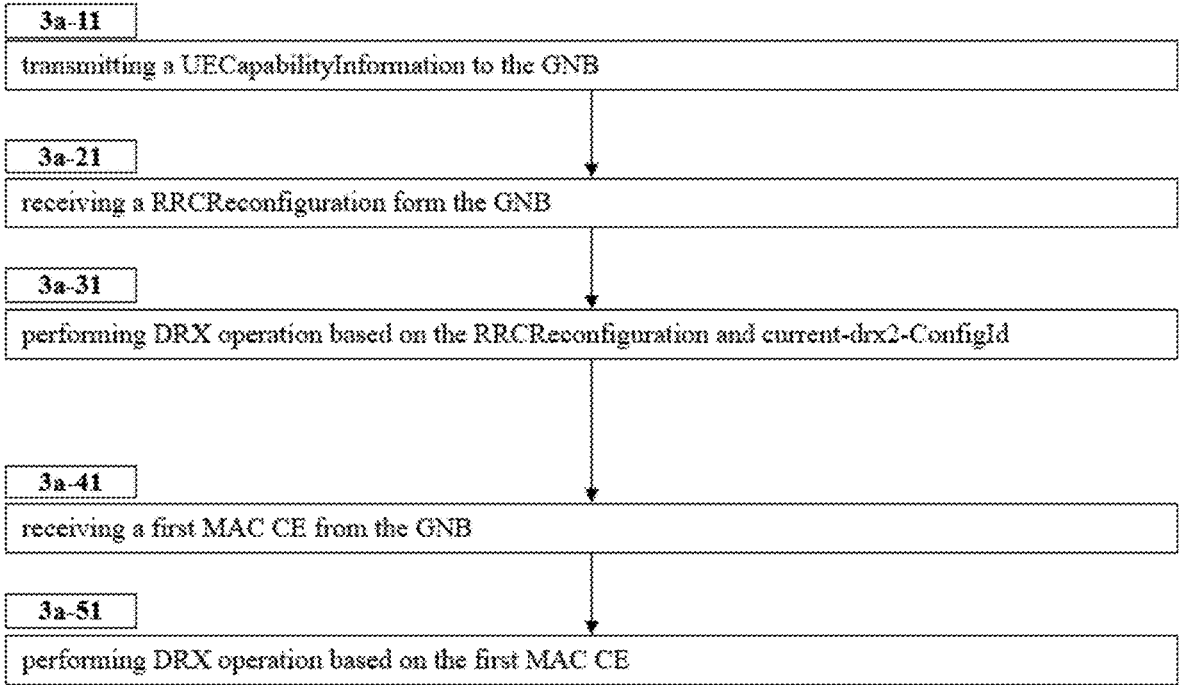
FIG. 3a is a flow diagram illustrating an DRX operation of a terminal.

FIG. 3a is a flow diagram illustrating an operation of a terminal for DRX.

In 3a-11, UE transmits a UECapabilityInformation to the GNB. The first RRC message contains information indicating the capability of the terminal for the second DRX and the third DRX and the second DTX and the third DTX.

In 3a-21, UE receives a RRCReconfiguration form the GNB.

In 3a-31, UE performs DRX operation based on the RRCReconfiguration. If the second RRC message contains the current-drx2-ConfigId for first cell and does not contain the current-drx2-ConfigId for second cell, the UE applies the third DRX for the first cell and the first DRX for the second cell.

In 3a-41, UE receives a first MAC CE from the GNB.

In 3a-51 UE performs DRX operation based on the first MAC CE.

If DRX1 is configured for a DRX group of the UE, UE performs DRX1 operation for the first serving cells and DRX3 operation for the second serving cells.

The first serving cell is currently active serving cell of the DRX group which is not second serving cell (DRX2 is neither configured nor activated). The second serving cell is the serving cell of the DRX group where DRX2 is configured and currently activated.

If DRX1 is not configured for a DRX group of the UE, UE does not perform any DRX operation for the first serving cells and performs DRX2 operation for the second serving cells.

If DRX1 is configured for a DRX group by the GNB, GNB performs DRX1 operation for the first serving cells and DRX3 operation for the second serving cells.

If DRX1 is not configured for a DRX group of the GNB, GNB does not perform DRX1 operation for the first serving cells and performs DRX2 operation for the second serving cells.

DRX2 of a serving cell is activated by RRCReconfiguration if current-dtx2-ConfigId is present in ServingCellConfig of the serving cell.

DRX2 of a serving cell is activated by the first MAC CE. UE monitors third serving cells to receive the first MAC CE. The third serving cell is the cell where DRX2 is configured and currently either activated and deactivated. To receive the first MAC CE, UE monitors a first searchSpace of the third serving cell based on a first RNTI. One or more first searchSpace is configured for a third serving cell. UE applies a first searchSpace configured for the currently active DL BWP. A first RNTI is configured for a third serving cell.

GNB transmits the first MAC CE in one of third serving cells. GNB applies a first searchSpace and a first RNTI of the third serving cell.

In DRX3 operation of PCell, UE monitors a second RNTI during a third period. UE does not monitor the second RNTI during a first period and a second period and a fourth period. The second RNTI is power saving RNTI.

In DRX3 operation of a second cell, UE receives configured downlink assignment (downlink_PDSCH_UE_pdsch_configured) for unicast during a first period and a third period. UE does not receive configured downlink assignment for unicast during a second period and a fourth period.

In DRX3 operation of a second cell, UE receives first set of reference signals during a first period and a second set of reference signals during a second period and a third set of reference signals during a third period. UE does not receives reference signal during a fourth period.

The first set of reference signals includes SSB and CSI-RS and first DM-RS and PRS. The first DM-RS includes DM-RS for SSB and DM-RS for PDCCH and DM-RS for first PDSCH and DM-RS for second PDSCH. The first PDSCH is PDSCH received based on dynamic scheduling (i.e. DCI). The second PDSCH is PDSCH received based on configured downlink assignments.

The second set of reference signals includes SSB and second DM-RS. The second DM-RS includes DM-RS for SSB.

The third set of reference signals includes third DM-RS and PRS. The third DM-RS includes DM-RS for second PDSCH.

In DRX3 operation of PCell, GNB transmits a second RNTI during a third period. GNB does not transmits the second RNTI during a first period and a second period and a fourth period. The second RNTI is power saving RNTI.

In DRX3 operation of a second cell, GNB transmits configured downlink assignment (downlink_PDSCH-_GNB_pdsch_configured) for unicast during a first period and a third period. GNB does not transmits configured downlink assignment for unicast during a second period and a fourth period.

In DRX3 operation of a second cell, GNB transmits a fifth set of reference signals during a first period (as indicated in table 10) and a sixth set of reference signals during a second period (as indicated in table 10) and a seventh set of reference signals during a third period (as indicated in table 10). GNB does not transmits reference signal during a fourth period.

In DRX2 operation of a PCell, UE monitors a second RNTI during a fifth period. UE does not monitor the second RNTI during a sixth period.

In DRX2 operation of an active serving cell, UE receives PRS during a fifth period. UE does not receive PRS during fifth period.

In DRX2 operation of an active serving cell, UE does not receive first TBs and receive second TBs during sixth period. First TB is a TB received in PDSCH. Second TB is a TB received in PSSCH.

The first period of a serving cell is the period when DRX1 of a first DRX group is in Active Time and DRX2 of the serving cell is in Active Time.

The second period of a serving cell is the period when DRX1 of a first DRX group is in Active Time and DRX2 of the serving cell is not in Active Time.

The third period of a serving cell is the period when DRX1 of a first DRX group is not in Active Time and DRX2 of the serving cell is in Active Time.

The fourth period of a serving cell is the period when DRX1 of a first DRX group is not in Active Time and DRX2 of the serving cell is not in Active Time.

The fifth period of a serving cell is the period when drx2-onDurationTimer of the serving cell is running.

The sixth period of a serving cell is the period when drx2-onDurationTimer of the serving cell is not running.

The first DRX group is DRX group where the serving cell belongs to.

Figure 3B:
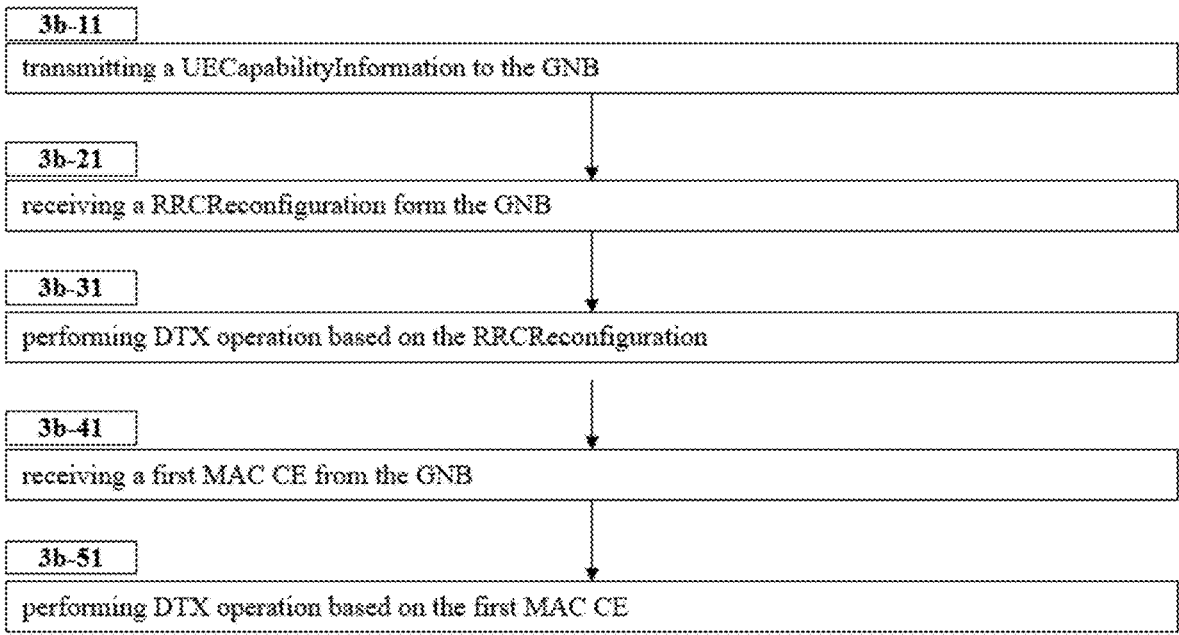
FIG. 3b is a flow diagram illustrating an DTX operation of a terminal.

FIG. 3b is a flow diagram illustrating an operation of a terminal for DTX

In 3b-11, UE transmits a UECapabilityInformation to the GNB.

In 3b-21, UE receives a RRCReconfiguration form the GNB.

In 3b-31, UE performs DTX operation based on the RRCReconfiguration.

In 3b-41, UE receives a first MAC CE from the GNB.

In 3b-51 UE performs DTX operation based on the MAC CE.

If DRX1 is configured for a DRX group of the UE, UE performs DTX1 operation for the first serving cells and DTX3 operation for the second serving cells.

The first serving cell is currently active serving cell of the DRX group which is not second serving cell (DTX2 is neither configured nor activated). The second serving cell is the serving cell of the DRX group where DTX2 is configured and currently activated.

If DRX1 is not configured for a DRX group of the UE, UE does not perform DTX1 operation for the first serving cells and performs DTX2 operation for the second serving cells.

DTX2 of a serving cell is activated by RRCReconfiguration if current-dtx2-ConfigId is present in ServingCell-Config of the serving cell.

DTX2 of a serving cell is activated by the first MAC CE. UE monitors third serving cells to receive the first MAC CE.

In DTX3 operation of a second cell, UE performs uplink initial transmission based on configured uplink grant during a first period and a third period. UE does not perform uplink initial transmission based on configured uplink grant during a second period and a fourth period. UE does not perform uplink retransmission for the configured uplink grant during a first period and a second period and a third period and a fourth period.

In DTX3 operation of a second cell, UE transmits first set of PUCCH during a first period and a second set of PUCCH during a second period and a third set of PUCCH during a third period. UE does not transmit PUCCH during a fourth period.

The first set of PUCCH includes HARQ feedback and periodic CSI and semi-persistent CSI and aperiodic CSI and SR.

The second set of PUCCH includes aperiodic CSI.

The third set of PUCCH includes aperiodic CSI and HARQ feedback.

The first period of a serving cell is the period when DRX1 of a first DRX group is in Active Time and DTX2 of the serving cell is in Active Time.

The second period of a serving cell is the period when DRX1 of a first DRX group is in Active Time and DTX2 of the serving cell is not in Active Time.

The third period of a serving cell is the period when DRX1 of a first DRX group is not in Active Time and DTX2 of the serving cell is in Active Time.

The fourth period of a serving cell is the period when DRX1 of a first DRX group is not in Active Time and DTX2 of the serving cell is not in Active Time.

The fifth period of a serving cell is the period when DTX2-onDurationTimer of the serving cell is running.

The sixth period of a serving cell is the period when DTX2-onDurationTimer of the serving cell is not running.

The first DRX group is DRX group where the serving cell belongs to.

Figure 4A:
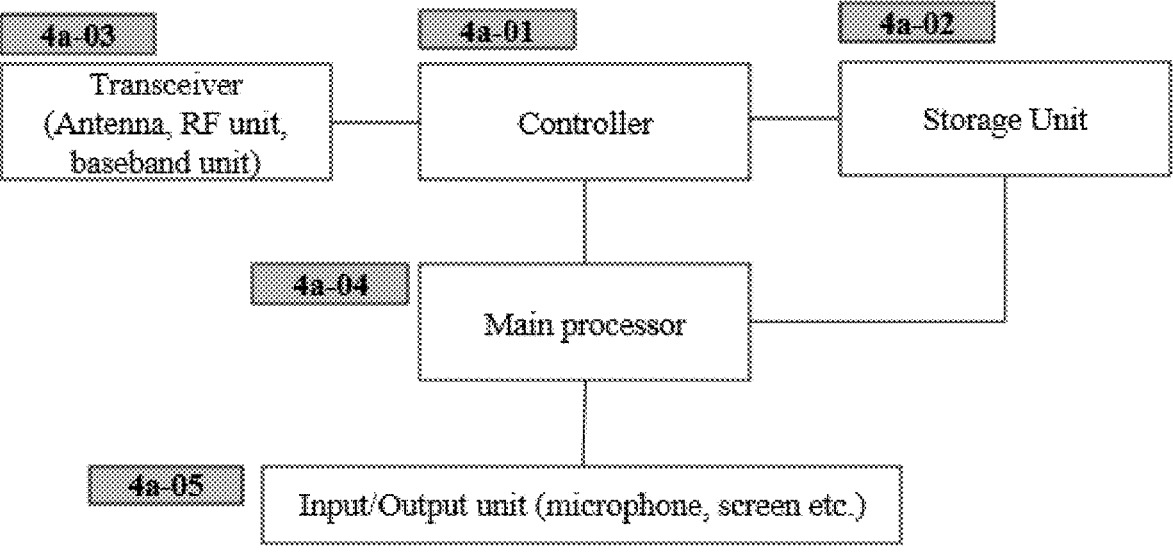
FIG. 4a is a block diagram illustrating the internal structure of a UE to which the disclosure is applied.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 controls the overall operations of the UE in terms of mobile communication. For example, the controller 4A-01 receives/transmits signals through the transceiver 4A-03. In addition, the controller 4A-01 records and reads data in the storage unit 4A-02. To this end, the controller 4A-01 includes at least one processor. For example, the controller 4A-01 may include a communication processor (CP) that performs control for communication and an application processor (AP) that controls the upper layer, such as an application program. The controller controls storage unit and transceiver such that UE operations illustrated in FIG. 2A and FIG. 2B and FIG. 3A are performed.

The storage unit 4A-02 stores data for operation of the UE, such as a basic program, an application program, and configuration information. The storage unit 4A-02 provides stored data at a request of the controller 4A-01.

The transceiver 4A-03 consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4A-04 controls the overall operations other than mobile operation. The main processor 4A-04 process user input received from I/O unit 4A-05, stores data in the storage unit 4A-02, controls the controller 4A-01 for required mobile communication operations and forward user data to I/O unit 4A-05.

I/O unit 4A-05 consists of equipment for inputting user data and for outputting user data such as a microphone and a screen. I/O unit 4A-05 performs inputting and outputting user data based on the main processor's instruction.

Figure 4B:
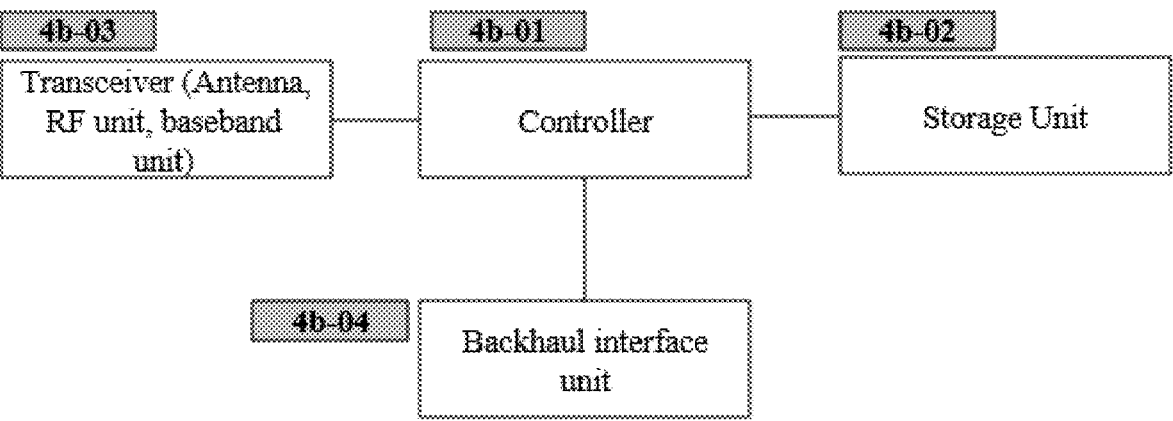
FIG. 4b is a block diagram illustrating the configuration of a base station according to the disclosure.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 controls the overall operations of the main base station. For example, the controller 4B-01 receives/transmits signals through the transceiver 4B-03, or through the backhaul interface unit 4B-04. In addition, the controller 4B-01 records and reads data in the storage unit 4B-02. To this end, the controller 4B-01 may include at least one processor. The controller controls transceiver, storage unit and backhaul interface such that base station operation illustrated in FIG. 2A and FIG. 2B are performed.

The storage unit 4B-02 stores data for operation of the main base station, such as a basic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to deter mine whether to provide the UE with multi-connection or to discontinue the same. In addition, the storage unit 4B-02 provides stored data at a request of the controller 4B-01.

The transceiver 4B-03 consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4B-04 provides an interface for communicating with other nodes inside the network. The backhaul interface unit 4B-04 converts a bit string transmitted from the base station to another node, for example, another base station or a core network, into a physical signal, and converts a physical signal received from the other node into a bit string.

What is claimed is:

1. A method by a terminal configured with two or more serving cells, the method comprising:
   receiving, by the terminal from a base station, a Radio Resource Control (RRC) message, wherein the RRC message comprises:
      a second Discontinuous Reception (DRX) parameter set of a first serving cell; and
      a second DRX parameter set of a second serving cell;
   receiving, by the terminal, downlink information related to a second DRX;
   activating, by the terminal and based on a first field associated with the first serving cell in the downlink information, the second DRX of the first serving cell in case that the first field comprises a first value;
   performing, by the terminal and for the first serving cell, a third DRX operation in case that a first DRX is configured for the terminal,
   wherein, for the third DRX operation, the terminal monitors a first Downlink Control Information (DCI) and does not monitor one or more second DCIs in the first serving cell in case that:
      the two or more serving cells are not in Active Time of the first DRX; and
      a timer configured for the second DRX of the first serving cell is running,
   wherein the first DRX is configured for the terminal in case that a first DRX parameter set is provided to the terminal.

2. The method of claim 1, wherein the first DCI notifies power saving information.

3. The method of claim 1, wherein the one or more second DCIs is:
   a DCI conveying Transmission Power Control (TPC) command for Sounding Reference Signal (SRS) transmission; or
   a DCI notifying availability of soft resources.

4. The method of claim 1, wherein, for the third DRX operation, the terminal does not monitor the first DCI and monitors the one or more second DCIs in the first serving cell in case that:

the two or more serving cells are in Active Time of the first DRX; and the timer configured for the second DRX of the first serving cell is running.

5. The method of claim 1, wherein, for the third DRX operation, the terminal monitor neither the first DCI nor the one or more second DCIs in the first serving cell in case that the timer configured for the second DRX of the first serving cell is not running.

6. The method of claim 1, wherein the second DRX parameter set of the first serving cell comprises:

a parameter related to a length of the timer configured for the second DRX of the first serving cell;

a parameter related to a cycle configured for the first serving cell; and a parameter related to a slot offset configured for the first serving cell.

7. The method of claim 6, wherein the parameter related to the length of the timer configured for the second DRX of the first serving cell indicates an active duration at a beginning of the cycle in the first serving cell.

8. The method of claim 6, wherein a time point when the timer configured for the second DRX of the first serving cell starts is determined based on:

the cycle configured for the first serving cell; and the slot offset configured for the first serving cell.

9. The method of claim 1, wherein the second DRX parameter set of the second serving cell comprises:

a parameter related to a length of a timer configured for the second DRX of the second serving cell;

a parameter related to a cycle configured for the second serving cell; and a parameter related to a slot offset configured for the second serving cell.

10. The method of claim 1, further comprising:

performing, by the terminal for the first serving cell, a second DRX operation in case that:

the first DRX is not configured for the terminal; and the first field associated with the first serving cell comprises the first value, and wherein the first DRX is not configured for the terminal in case that the first DRX parameter set is not provided to the terminal.

11. The method of claim 10, wherein, for the second DRX operation and in case that the timer configured for the second DRX of the first serving cell is running, the terminal:

monitors the one or more second DCIs in the first serving cell; and does not monitor the first DCI in the first serving cell.

12. The method of claim 10, wherein, for the second DRX operation and in case that the timer configured for the second DRX of the first serving cell is not running, the terminal:

does not monitor the one or more second DCIs in the first serving cell; and does not monitor the first DCI in the first serving cell.

13. The method of claim 1, further comprising:

receiving, by the terminal, the downlink information related to the second DRX;

activating, by the terminal and based on the first field associated with the second serving cell, the second DRX of the second serving cell in case that the first field associated with the second serving cell comprises the first value;

performing, by the terminal and for the second serving cell, the third DRX operation of the second serving cell in case that the first DRX is configured for the terminal, wherein, for the third DRX operation of the second serving cell, the terminal monitors neither the first Downlink Control Information (DCI) nor the one or more second DCIs in the second serving cell in case that:

the two or more serving cells are not in Active Time of the first DRX; and a timer configured for the second DRX of the second serving cell is running.

14. The method of claim 13, wherein, for the third DRX operation of the second serving cell, the terminal does not monitor the first DCI and monitors the one or more second DCIs in the second serving cell in case that:

the two or more serving cells are in Active Time of the first DRX; and the timer configured for the second DRX of the second serving cell is running.

15. The method of claim 13, wherein, for the third DRX operation of the second serving cell, the terminal monitor neither the first DCI nor the one or more second DCIs in the second serving cell in case that the timer configured for the second DRX of the second serving cell is not running.

16. The method of claim 1, wherein the first DRX is configured for the terminal in case that a first DRX parameter set is provided to the terminal.

17. The method of claim 1, wherein the first DRX parameter set comprises:

a parameter related to a drx-onDurationTimer;

a parameter related to a drx-InactivityTimer;

a parameter related to a drx-RetransmissionTimerDL; and a parameter related to a drx-RetransmissionTimerUL.

18. The method of claim 1, wherein the two or more serving cells are in Active Time in case that:

a drx-onDurationTimer is running; or a drx-InactivityTimer is running.

19. A terminal comprising:

a transceiver, a memory, and a controller coupled to the transceiver and the memory, wherein the controller is configured to cause the terminal to:

receive, from a base station, a Radio Resource Control (RRC) message, wherein the RRC message comprises:

a second Discontinuous Reception (DRX) parameter set of a first serving cell; and a second DRX parameter set of a second serving cell, receive downlink information related to a second DRX, activate, based on a first field associated with the first serving cell in the downlink information, the second DRX of the first serving cell in case that the first field comprises a first value;

perform, for the first serving cell, a third DRX operation in case that a first DRX is configured for the terminal, wherein, for the third DRX operation, the terminal monitors a first Downlink Control Information (DCI) and does not monitor one or more second DCIs in the first serving cell in case that:

the two or more serving cells are not in Active Time of the first DRX; and a timer configured for the second DRX of the first serving cell is running, wherein the first DRX is configured for the terminal in case that a first DRX parameter set is provided to the terminal.

20. A method by a base station, the method comprising:

transmitting, by the base station and to a terminal configured with two or more serving cells, a Radio Resource Control (RRC) message, wherein the RRC message comprises:

a second Discontinuous Reception (DRX) parameter set of a first serving cell; and a second DRX parameter set of a second serving cell;

transmitting, by the base station to the terminal, downlink information related to a second DRX;

activating, by the base station and based on a first field associated with the first serving cell of the terminal in the downlink information, the second DRX of the first serving cell of the terminal in case that the first field comprises a first value; and performing, by the base station and for the first serving cell, a third DRX operation in case that a first DRX is configured for the terminal, wherein, for the third DRX operation, the base station transmits a first Downlink Control Information (DCI) and does not transmit one or more second DCIs in the first serving cell in case that:

the two or more serving cells of the terminal are not in Active Time of the first DRX; and a timer configured for the second DRX of the first serving cell of the terminal is running, wherein the first DRX is configured for the terminal in case that a first DRX parameter set is provided to the terminal.

\* \* \* \* \*